(12) United States Patent
Shibahara et al.

(10) Patent No.: US 10,602,047 B2
(45) Date of Patent: Mar. 24, 2020

(54) IMAGE PHOTOGRAPHING METHOD PERFORMED WITH TERMINAL DEVICE HAVING CAMERA FUNCTION

(71) Applicant: PANASONIC INTELLECTUAL PROPERTY MANAGEMENT CO., LTD., Osaka (JP)

(72) Inventors: Youji Shibahara, Tokyo (JP); Toshiyasu Sugio, Osaka (JP); Toru Matsunobu, Osaka (JP); Yuki Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/223,982

(22) Filed: Dec. 18, 2018

(65) Prior Publication Data
US 2019/0124254 A1 Apr. 25, 2019

Related U.S. Application Data

(63) Continuation of application No. 15/390,582, filed on Dec. 26, 2016, now Pat. No. 10,205,867, which is a
(Continued)

(30) Foreign Application Priority Data

Dec. 26, 2014 (JP) ................... 2014-265788

(51) Int. Cl.
*H04N 5/232* (2006.01)
*H04N 21/242* (2011.01)
(Continued)

(52) U.S. Cl.
CPC .......... *H04N 5/23206* (2013.01); *H04N 5/04* (2013.01); *H04N 21/242* (2013.01); *H04N 21/4305* (2013.01)

(58) Field of Classification Search
CPC .. H04N 5/23206; H04N 5/04; H04N 21/4305; H04N 21/242
See application file for complete search history.

(56) References Cited

U.S. PATENT DOCUMENTS

| 2004/0183915 A1* | 9/2004 | Gotohda | H04N 5/232 348/207.11 |
| 2005/0151852 A1* | 7/2005 | Jomppanen | H04N 5/0733 348/218.1 |

(Continued)

FOREIGN PATENT DOCUMENTS

| JP | 2002-033951 | 1/2002 |
| JP | 2005-130030 | 5/2005 |

(Continued)

OTHER PUBLICATIONS

International Search Report of PCT application No. PCT/JP2015/002680 dated Jul. 28, 2015.

*Primary Examiner* — Lin Ye
*Assistant Examiner* — John H Morehead, III
(74) *Attorney, Agent, or Firm* — Greenblum & Bernstein, P.L.C.

(57) ABSTRACT

A photographing method in which a terminal device performs photographing is provided. The photographing method includes synchronizing a clock of the terminal device with a reference clock, and acquiring photographing clock time information indicating a photographing clock time which is based on the reference clock through a communication network. The photographing method also includes specifying a photographing delay time until the photographing is performed since photographing start in the terminal device, and photographing a subject at the photographing clock time indicated by the photographing clock time information. The photographing clock time being based on the clock of the terminal device already synchronized with the reference clock.

24 Claims, 17 Drawing Sheets

Related U.S. Application Data continuation of application No. PCT/JP2015/002680, filed on May 27, 2015.

(60) Provisional application No. 62/018,938, filed on Jun. 30, 2014.

(51) Int. Cl.
*H04N 21/43* (2011.01)
*H04N 5/04* (2006.01)

(56) References Cited

U.S. PATENT DOCUMENTS

| | | | | |
|---|---|---|---|---|
| 2007/0216691 A1* | 9/2007 | Dobrin | ............... | H04N 5/073 345/473 |
| 2011/0157389 A1* | 6/2011 | McClellan | ............. | H04N 5/232 348/222.1 |
| 2011/0252265 A1* | 10/2011 | Iwami | ............... | H04N 19/645 713/401 |
| 2013/0038755 A1* | 2/2013 | Sato | ............... | H04N 5/772 348/231.5 |
| 2013/0242058 A1* | 9/2013 | Bae | ............... | G01S 17/107 348/47 |
| 2013/0287122 A1* | 10/2013 | Mizosoe | ............ | H04N 21/2365 375/240.26 |
| 2014/0313413 A1 | 10/2014 | Oami et al. | | |
| 2016/0094773 A1* | 3/2016 | Maciuca | ............ | H04N 5/23206 348/207.11 |

FOREIGN PATENT DOCUMENTS

| | | |
|---|---|---|
| JP | 2008-219292 | 9/2008 |
| JP | 2008-311791 | 12/2008 |
| JP | 2010-135926 | 6/2010 |
| JP | 2010-154261 | 7/2010 |
| JP | 2013-011928 | 1/2013 |
| WO | 2012/120763 | 9/2012 |
| WO | 2013/094115 | 6/2013 |

\* cited by examiner

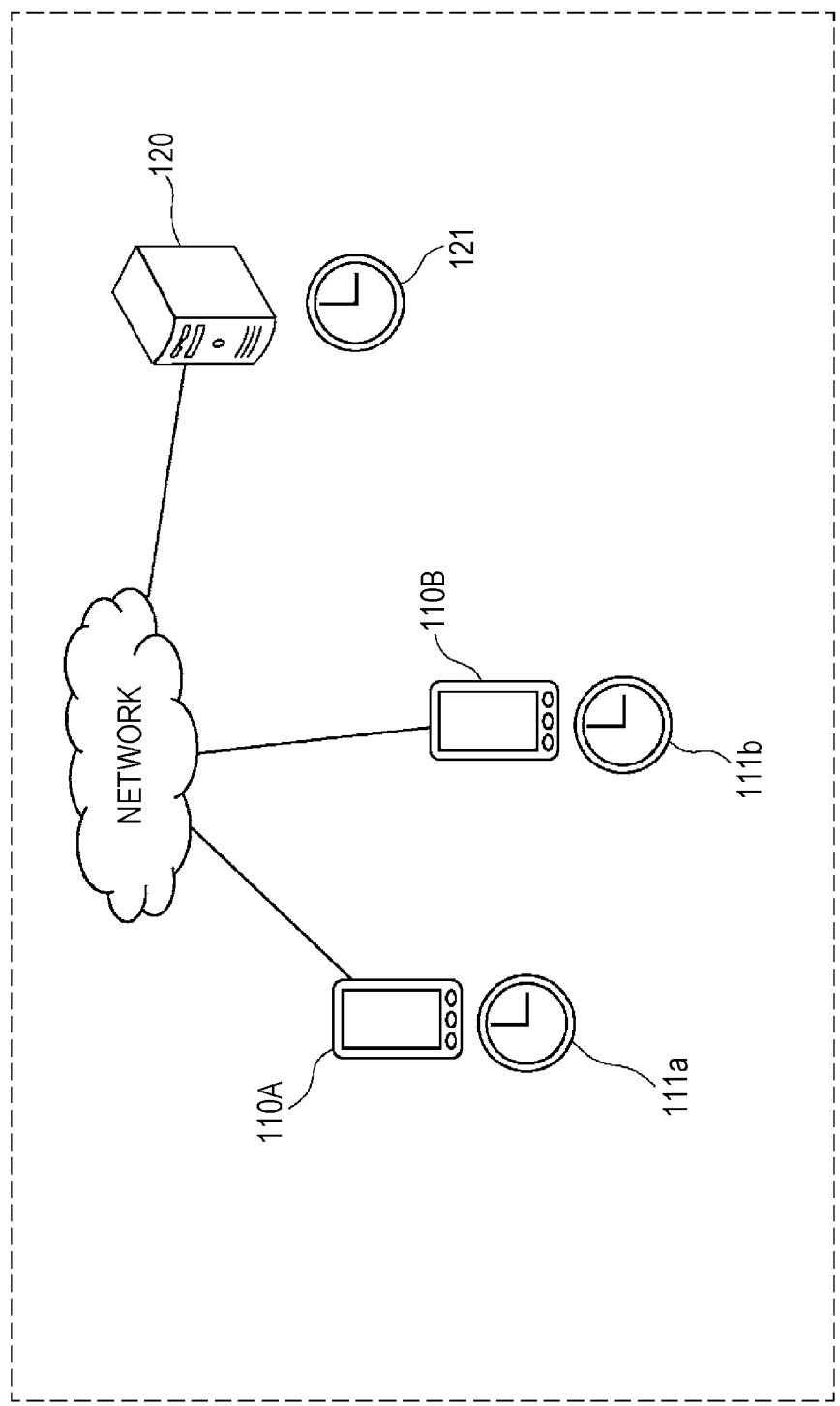

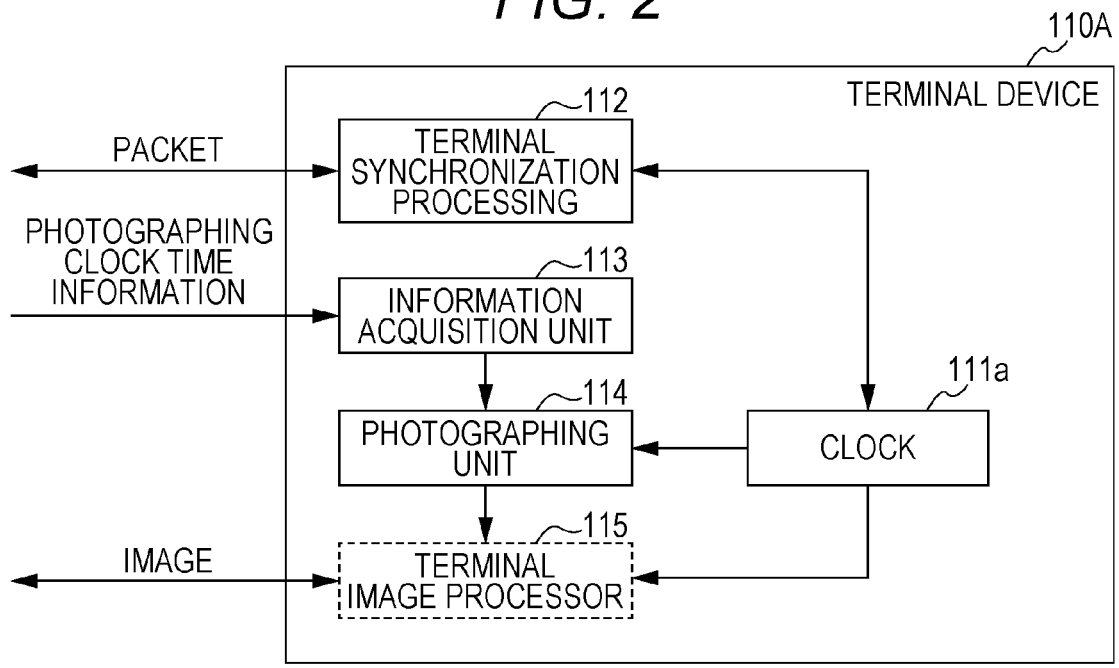
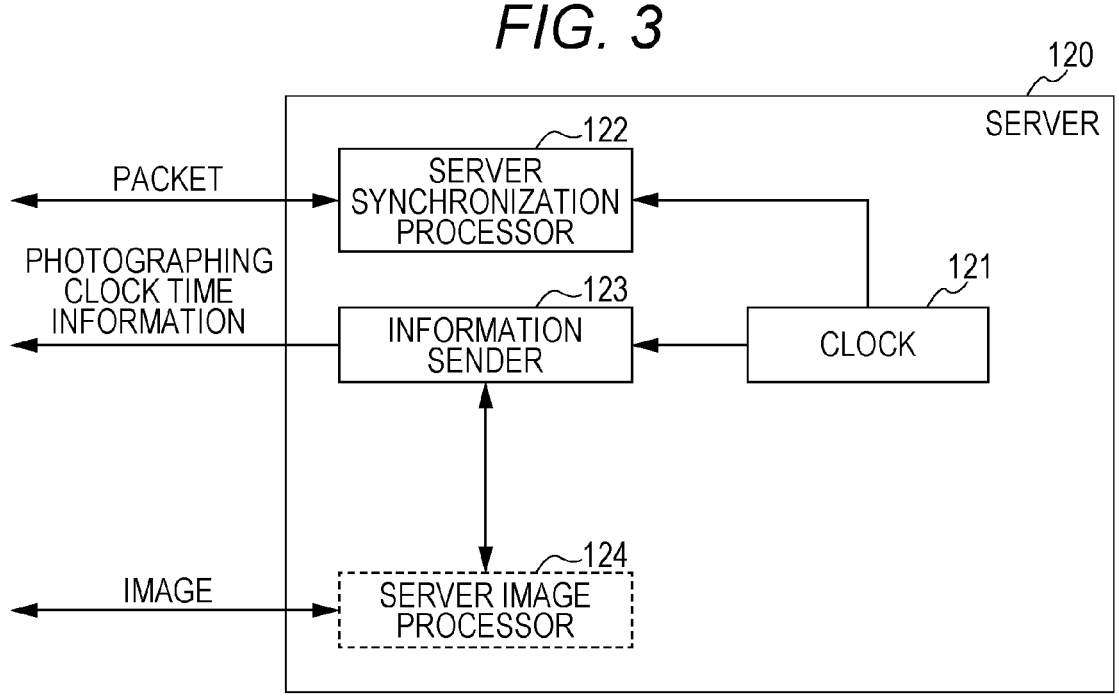

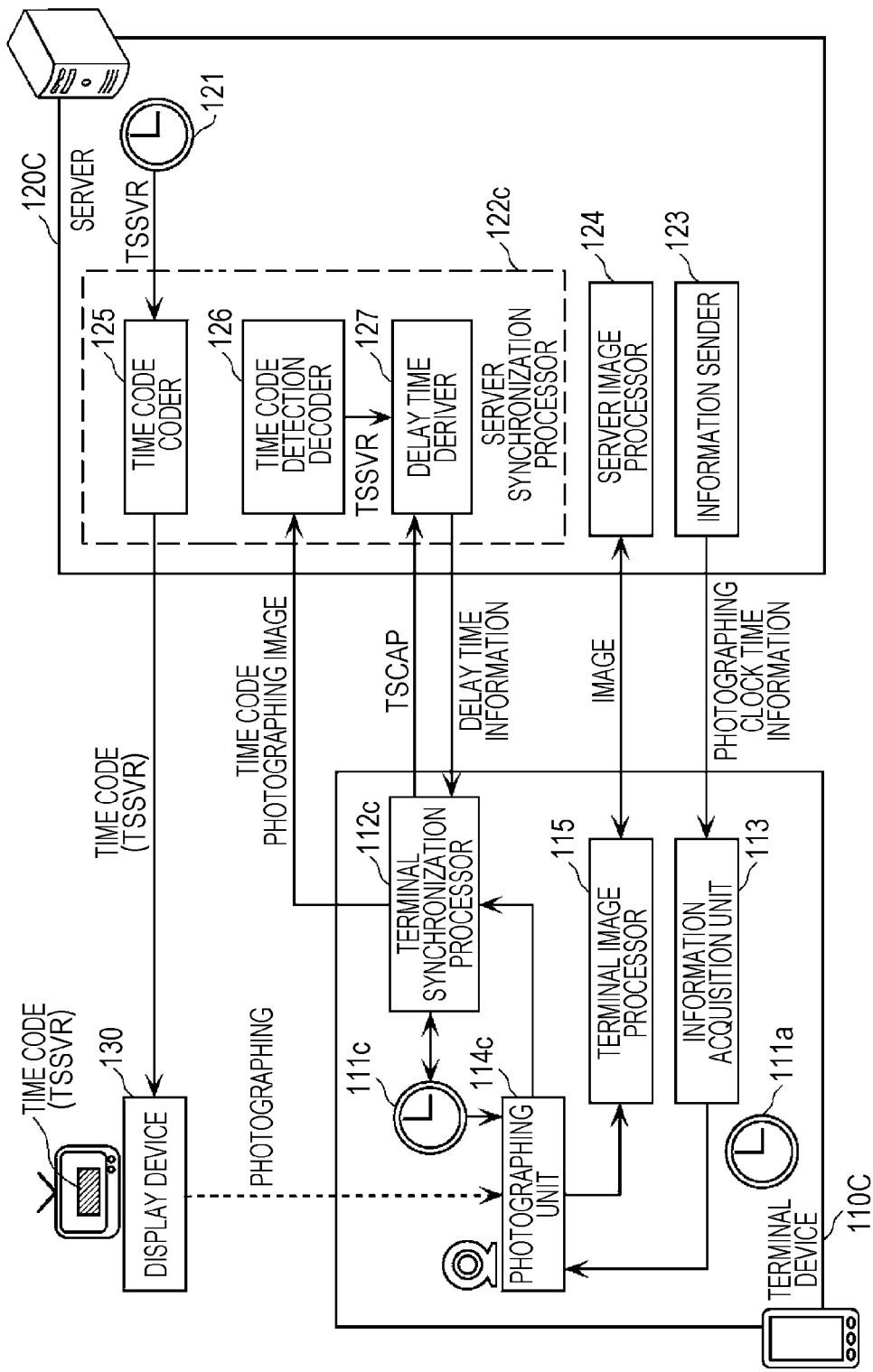

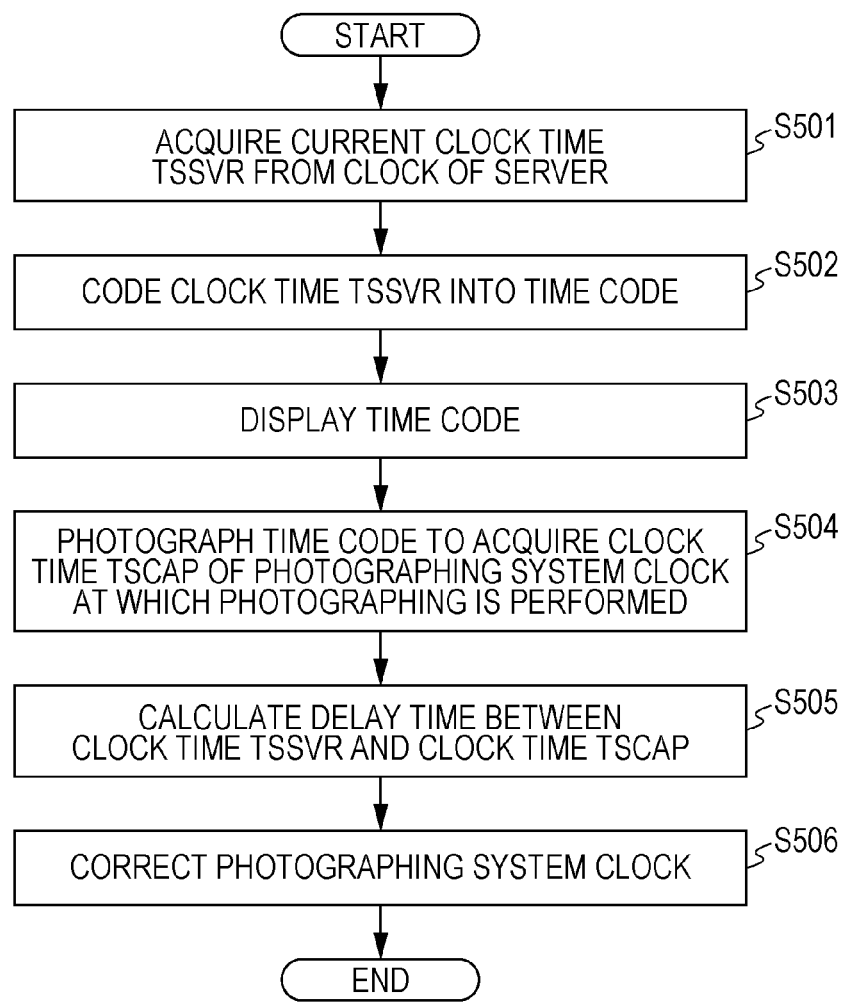

FIG. 9A

STORAGE OF NUMERICAL VALUES FROM PLACE REPRESENTING SECOND TO PLACE REPRESENTING ONE-THOUSANDTH SECOND

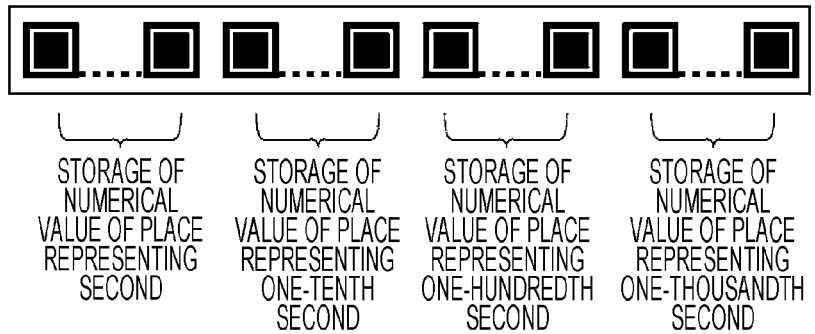

FIG. 9B

STORAGE OF NUMERICAL VALUE OF PLACE REPRESENTING SECOND | STORAGE OF NUMERICAL VALUE OF PLACE REPRESENTING ONE-TENTH SECOND | STORAGE OF NUMERICAL VALUE OF PLACE REPRESENTING ONE-HUNDREDTH SECOND | STORAGE OF NUMERICAL VALUE OF PLACE REPRESENTING ONE-THOUSANDTH SECOND

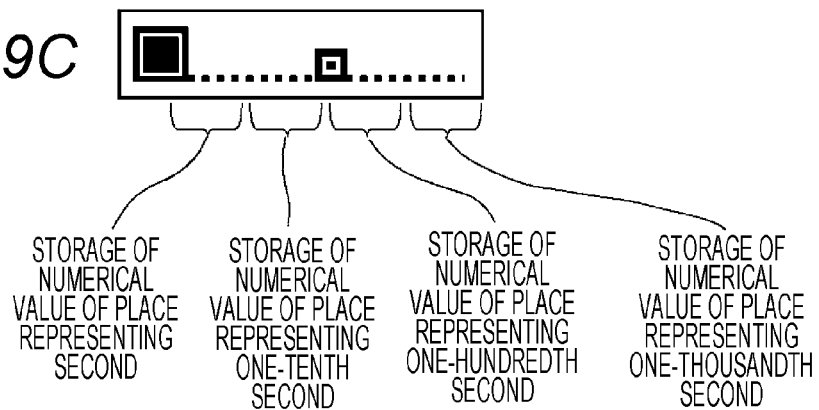

FIG. 9C

STORAGE OF NUMERICAL VALUE OF PLACE REPRESENTING SECOND | STORAGE OF NUMERICAL VALUE OF PLACE REPRESENTING ONE-TENTH SECOND | STORAGE OF NUMERICAL VALUE OF PLACE REPRESENTING ONE-HUNDREDTH SECOND | STORAGE OF NUMERICAL VALUE OF PLACE REPRESENTING ONE-THOUSANDTH SECOND

IMAGE PHOTOGRAPHING METHOD PERFORMED WITH TERMINAL DEVICE HAVING CAMERA FUNCTION

CROSS REFERENCE TO RELATED APPLICATIONS

This application is a continuation application of pending U.S. application Ser. No. 15/390,582, filed on Dec. 26, 2016, which is a Continuation Application of International Application No. PCT/JP2015/002680, filed on May 27, 2015, which claims priority to Japanese Application No. 2014-265788, filed on Dec. 26, 2014, and claims the benefit of U.S. Provisional Application No. 62/018,938, filed on Jun. 30, 2014, the contents of which are expressly incorporated by reference herein in their entireties.

BACKGROUND

1. Technical Field

The present disclosure relates to an image photographing method performed with a camera or a terminal device having a camera function.

2. Description of the Related Art

There is a method for sharing an image (a still image or a moving image) between people that are in a given place during a travel or an event (for example, see PTL 1). In the method of PTL 1, a server temporarily makes a shared group constructed with a plurality of cameras based on a similarity degree of a subject or positional information about the subject. When an image from the plurality of cameras are integrated to construct a virtual reality space or to three-dimensionally reconfigure the subject (that is, generation of a three-dimensional image), it is necessary to synchronize clock times of the plurality of cameras with each other. For example, a cable release of an accessory that activates a shutter of the camera is branched into a plurality of pieces, and the shutters of the plurality of cameras are simultaneously activated by one-time operation. Otherwise, there is a method for simultaneously activating the shutters of the plurality of cameras while an electric signal line is distributed to control the cameras. Otherwise, there is a method for correcting a photographing timing deviation between the cameras based on specific visual events such as a flash light and a door opening or closing operation taken in a moving image (for example, see PTL 2). Otherwise, there is a method for synchronizing the photographing timing with light emitted from a periodically blinking lighting device (for example, see PTL 3).

CITATION LIST

Patent Literatures

PTL 1: Japanese Patent No. 5271693
PTL 2: Japanese Translation of PCT Publication No. 13/094115
PTL 3: Japanese Patent No. 5213045

However, in the methods of the PTLs 1 to 3, the photographing clock time is hardly matched with desired timing with high accuracy.

SUMMARY

One non-limiting and exemplary embodiment provides a photographing method for easily matching the photographing clock time with the desired timing with high accuracy.

In one general aspect, the techniques disclosed here feature a photographing method including: synchronizing a clock of a first terminal device with a reference clock; acquiring photographing clock time information indicating a photographing clock time based on the reference clock through a communication network; and performing photographing at the photographing clock time indicated by the photographing clock time information based on the clock of the first terminal device already synchronized with the reference clock.

In the photographing method according to one aspect of the present disclosure, the photographing clock time can easily be matched with the desired timing with high accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

These general or specific aspects may be implemented by a system, a method, an integrated circuit, a computer program, a recording medium such as a computer-readable CD-ROM, or any combination of the system, the method, the integrated circuit, the computer program, and the recording medium.

BRIEF DESCRIPTION OF THE DRAWINGS

FIG. 1 is a view illustrating a photographing system that performs photographing by a photographing method according to a first exemplary embodiment;

FIG. 2 is a block diagram illustrating a configuration of a terminal device of the first exemplary embodiment;

FIG. 3 is a block diagram illustrating a configuration of a server of the first exemplary embodiment;

FIG. 6 is a view illustrating a photographing system that performs photographing by a photographing method according to a second exemplary embodiment;

FIG. 7 is a flowchart illustrating synchronization processing of a terminal synchronization processor and a server synchronization processor of the second exemplary embodiment;

FIG. 9A is a view illustrating another example of the time code of the second exemplary embodiment;

FIG. 9B is a view illustrating another example of the time code of the second exemplary embodiment;

FIG. 9C is a view illustrating another example of the time code of the second exemplary embodiment;

Figure 4A:
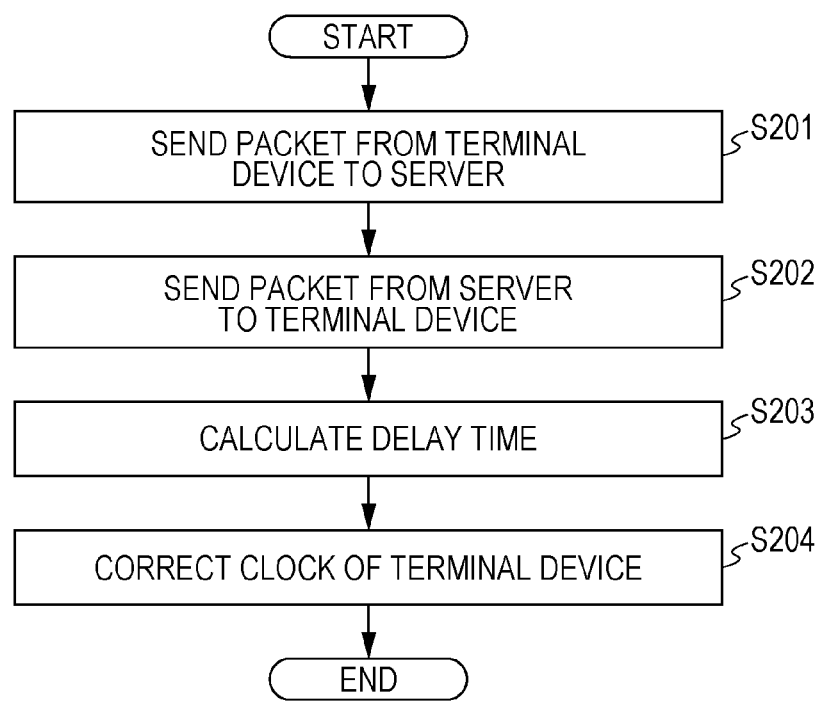
FIG. 4A is a flowchart illustrating processing operations of a terminal synchronization processor and a server synchronization processor of the first exemplary embodiment.

DETAILED DESCRIPTION (Underlying Knowledge of the Present Disclosure)

In the method for causing a plurality of terminal devices (for example, a plurality of cameras) to simultaneously perform the photographing by distributing the cable release or a control signal, although the photographing can simultaneously be performed with high accuracy, it is necessary to prepare equipment before the photographing. Accordingly, the photographing method is not suitable for temporary applications such as a journey and an event. In the example in which the specific visual event shown in the moving image is used, because many similar frame are generated when motion of a body that perform the event is extremely slow, accuracy of adjusting the clock time degrades between the terminal devices. That is, it is difficult to search the most similar frame from frames acquired by performing the photographing with the plurality of terminal devices. In the method for synchronizing the photographing timing with the light emitted from the periodically blinking lighting device, even if the photographing timing can be adjusted, it is unknown which one of clock times the photographing is performed. When a delay is generated in transmitting each image acquired by the photographing through the network, the photographing clock time of each image deviates. Additionally, because the flash light is an eyesore, the flash light is hardly used in a large-scale space people gather.

In one general aspect, the techniques disclosed here feature a photographing method including: synchronizing a clock of a first terminal device with a reference clock; acquiring photographing clock time information indicating a photographing clock time based on the reference clock through a communication network; and performing photographing at the photographing clock time indicated by the photographing clock time information based on the clock of the first terminal device already synchronized with the reference clock.

Because the clock of the first terminal device is previously synchronized with the reference clock, when the photographing clock time information is acquired shortly before the photographing clock time, the photographing can be performed in timing accurately matched with the photographing clock time based on the reference clock. Accordingly, the photographing clock time can easily be matched with the desired timing with high accuracy.

The photographing method may further include: acquiring the photographing clock time information through the communication network with a second terminal device; and performing the photographing with the second terminal device at the photographing clock time indicated by the photographing clock time information based on the reference clock. For example, the reference clock is a clock included in a server, the second terminal device synchronizes a clock of the second terminal device with the reference clock, and each of the first and second terminal devices acquires the photographing clock time information from the server. Otherwise, the reference clock may be a clock of the second terminal device, and each of the first and second terminal devices may acquire the photographing clock time information from a server.

Therefore, the photographing timings can more accurately be matched with each other between the plurality of terminal devices.

In synchronizing the clock of the first terminal device, the first terminal device may synchronize a photographing clock managed based on a system clock of the first terminal device with the reference clock as the clock of the first terminal device. The photographing clock is what is called a virtual clock.

Because not the system clock of the first terminal device but the photographing clock is adjusted and synchronized with the reference clock, an influence caused by the clock synchronization on processing except for the photographing can be avoided in the first terminal device. Accordingly, in the first terminal device, the processing except for the photographing can be maintained after the synchronization, the processing except for the photographing being performed based on the system clock.

The photographing method may further include sending a time stamp indicating a clock time the photographing is performed based on the clock of the first terminal device already synchronized with the reference clock while the time stamp is added to an image acquired by the photographing.

When acquiring the image from the first terminal device, the server can easily specify the clock time the image is photographed. As a result, using the clock time, the server can properly perform image processing such as generation of the three-dimensional image.

The photographing method may further include specifying a photographing delay time until the photographing is performed since photographing start in the first terminal device. At this point, in performing the photographing with the first photographing device, the photographing may be started at a clock time earlier than the photographing clock time indicated by the photographing clock time information by the photographing delay time.

For example, even if the photographing is started at the photographing clock time indicated by the photographing clock time information, sometimes the timing of actually performing the photographing is delayed from the photographing clock time due to various physical factors. On the other hand, in one aspect of the present disclosure, the delay is specified as the photographing delay time, and the photographing is started at the clock time earlier than the photographing clock time by the photographing delay time. Accordingly, the photographing can be performed in timing more accurately matched with the photographing clock time based on the reference clock without being influenced by various physical factors.

In specifying the photographing delay time, every time a clock time based on the reference clock is updated, the first terminal device may photograph a subject displaying the updated clock time, and a difference between a clock time based on the clock of the first terminal device at which the photographing of the subject is started and a clock time shown in a subject image acquired by the photographing may be specified as the photographing delay time.

Therefore, the clock time the photographing is actually performed is shown in the image, so that the correct photographing delay time can be specified.

In synchronizing the clock of the first terminal device, the first terminal device may send a first packet to a server to receive a second packet indicating a clock time based on the reference clock from the server, and the clock of the first terminal device may be adjusted and synchronized with the reference clock such that a difference between the clock time indicated by the second packet and a clock time based on the clock of the first terminal device in sending the first packet to the server becomes zero.

Therefore, the clock of the first terminal device can easily and correctly be synchronized with the reference clock using, for example, the NTP or the RTCP In synchronizing the clock of the first terminal device, every time a clock time based on the reference clock is updated, the first terminal device may photograph a subject displaying the updated clock time, and the clock of the first terminal device may be adjusted and synchronized with the reference clock such that a difference between a clock time based on the clock of the first terminal device and a clock time shown in a subject image acquired by the photographing becomes zero. For example, the subject displays a clock time updated based on the reference clock as a one-dimensional code or a two-dimensional code.

Therefore, the clock time the photographing is actually performed based on the reference clock is shown in the image, so that the clock of the first terminal device can more easily and more correctly be synchronized with the reference clock.

The photographing method may further include: coding individually a numerical value of each place expressing a clock time based on the reference clock; and displaying the coded numerical value of each place in the subject. For example, in the numerical value of each place, the numerical value of a first place is updated, coded, and displayed every time the clock time based on the reference clock is updated, and the numerical value of a second place is updated, coded, and displayed every time the clock time is updated N times (N is an integer of 2 or more).

Therefore, for example, the numerical value of a second place, the numerical value of a one-tenth second place, and the numerical value of a one-hundredth second place are individually coded and displayed in order to express the clock time based on the reference clock. For example, when the clock time based on the reference clock has accuracy of one-hundredth second, the numerical value of a one-hundredth second place is updated, coded, and displayed every time the clock time of the reference clock is updated, and the numerical value of a one-tenth second place is updated, coded, and displayed every time the clock time of the reference clock is updated ten times. Even if the clock time of the reference clock shown in the image can hardly be specified with accuracy of one-hundredth second because a slow moving image photographing frame rate of the first terminal device, the clock time can be specified with accuracy of second or one-tenth second. As a result, the clock of the first terminal device can correctly be synchronized with the reference clock while the influence of the moving image photographing frame rate is suppressed.

The one-dimensional code or the two-dimensional code may be a rectangle in which a horizontal width is longer than a vertical width.

Therefore, even if the one-dimensional code or two-dimensional code shown on the subject as a time code is horizontally photographed at any angle, the clock time expressed by the time code can correctly be read. That is, generation of a time code reading error depending on a photographing direction can be suppressed.

In performing the photographing with the first terminal device, the photographing of a moving image may be started from the photographing clock time indicated by the photographing clock time information, and the first terminal device may send only a picture acquired in each second period longer than a first period in pictures acquired in each first period by the photographing of the moving image to a server. The photographing method may further include acquiring period information indicating the second period from the server with the first terminal device. At this point, in sending the picture to the server, only a picture acquired in each second period indicated by the acquired period information is selected from the pictures acquired in each first period, and the selected picture is sent to the server.

Therefore, the frame rate of the moving image sent to the server can properly be reduced and a processing burden on the server can be reduced.

In one general aspect, the techniques disclosed here feature a photographing system includes: a server; and a plurality of terminal devices connected to the server through a communication network. At this point, the server includes: a first processor; and a first memory having a first computer program and a reference clock stored thereon, the first computer program causing the first processor to execute operations including: synchronizing a clock of each of the plurality of terminal devices with the reference clock of the server; and sending photographing clock time information indicating a photographing clock time based on the reference clock of the server to each of the plurality of terminal devices through the communication network, each of the plurality of terminal devices includes: a second processor; and a second memory having a second computer program and a clock stored thereon, the second computer program causing the second processor to execute operations including: synchronizing the clock of the terminal device with the reference clock of the server according to synchronization processing of the server; acquiring the photographing clock time information sent from the server through the communication network; and performing photographing at a photographing clock time indicated by the photographing clock time information based on the clock of the terminal device already synchronized with the reference clock of the server.

Therefore, the clocks of the plurality of terminal devices are previously synchronized with the reference clock, when the photographing clock time information is acquired shortly before the photographing clock time, so that the plurality of terminal devices can simultaneously perform the photographing in timing accurately matched with the photographing clock time based on the reference clock. Accordingly, the photographing clock times of the plurality of terminal devices can easily be matched with the desired timing with high accuracy.

In one general aspect, the techniques disclosed here feature a server includes: synchronization processor that synchronizes a clock of each of a plurality of terminal devices with a reference clock; and an information sender that sends photographing clock time information indicating a photographing clock time based on the reference clock to each of the plurality of terminal devices through a communication network.

Therefore, the clocks of the plurality of terminal devices can be synchronized with the reference clock, and the plurality of terminal devices can perform the photographing in timing accurately matched with the photographing clock time based on the reference clock when the photographing clock time information is sent to each terminal device shortly before the photographing clock time. Accordingly, the photographing clock time can easily be matched with the desired timing with high accuracy.

These general or specific aspects may be implemented by a system, a method, an integrated circuit, a computer program, a recording medium such as a computer-readable CD-ROM, or any combination of the system, the method, the integrated circuit, the computer program, and the recording medium.

Hereinafter, exemplary embodiments will be described with reference to the drawings.

The following exemplary embodiments illustrate general or specific examples. The following numerical values, shapes, materials, constituents, displacement positions and a connection mode of the constituents, steps, and step order of the exemplary embodiments are illustrated only by way of example, but the present disclosure is not limited to the numerical values, shapes, materials, constituents, displacement positions and a connection mode of the constituents, steps, and step order. In the following constituents of the exemplary embodiments, the constituent that is not described in the independent claim indicating the highest concept is described as any constituent.

First Exemplary Embodiment

A photographing method according to a first exemplary embodiment will be described below.

FIG. 1 is a view illustrating a photographing system that performs photographing by the photographing method of the first exemplary embodiment.

The photographing system of the first exemplary embodiment includes terminal device 110A, terminal device 110B, and server 120, which are connected to each other through a communication network (hereinafter, simply referred to as a network). Terminal devices 110A and 110B are first and second terminal devices having moving image or still image photographing function, respectively. For example, terminal devices 110A and 110B are constructed as a camera, a smartphone, or a monitoring camera. Terminal device 110A includes clock 111a that is an internal timepiece, and terminal device 110B also includes clock 111b that is an internal timepiece. In the first exemplary embodiment, because terminal devices 110A and 110B have an identical configuration, only terminal device 110A will be described in detail. Server 120 includes clock 121 that is an internal timepiece. Clock 121 of server 120 is used as a reference clock. Clocks 111a, 111b, 121 individually updates a clock time in a periodical manner.

Server 120 causes terminal devices 110A and 110B to conduct communication with each other to synchronize clocks 111a and 111b of terminal devices 110A and 110B with clock 121 of server 120. Therefore, the clock times of clocks 111a and 111b are matched with the clock time at clock 121 that is the reference clock. Server 120 notifies terminal devices 110A and 110B of a photographing clock time through the network to cause terminal devices 110A and 110B to perform the photographing at the photographing clock time.

Therefore, in the photographing system of the first exemplary embodiment, the photographing clock times the plurality of terminal devices take the moving image or still image can be matched with each other with high accuracy.

FIG. 2 is a block diagram illustrating a configuration of terminal device 110A.

Terminal device 110A includes clock 111a, terminal synchronization processor 112, information acquisition unit 113, photographing unit 114, and terminal image processor 115.

Terminal synchronization processor 112 sends and receives a packet to and from server 120 to correct (or adjust) the clock time at clock 111a of terminal device 110A, thereby synchronizing clock 111a with clock 121 of server 120. That is, terminal synchronization processor 112 matches the clock time at clock 111a with the clock time at clock 121.

Information acquisition unit 113 acquires photographing clock time information indicating the photographing clock time based on clock 121 of server 120 from server 120 through the network.

Based on clock 111a of terminal device 110A already synchronized with clock 121 of server 120, photographing unit 114 performs the photographing at the photographing clock time indicated by the acquired photographing clock time information. When performing the moving image photographing, photographing unit 114 deals with the photographing clock time as a photographing start clock time, and starts the moving image photographing at a predetermined frame rate from the photographing start clock time.

Terminal image processor 115 sends an image photographed with photographing unit 114 to server 120. When sending the image to server 120, terminal image processor 115 adds the clock time, at which the photographing is performed or the image is acquired based on corrected clock 111a, to the image as a time stamp. Terminal image processor 115 also adds an identifier identifying the terminal device (specifically, terminal device 110A), which performs the photographing to acquire the image, to the image. In other words, terminal image processor 115 adds the time stamp, which indicates the clock time the photographing is performed based on clock 111a of terminal device 110A already synchronized with the reference clock, to the photographed image. Terminal image processor 115 sends the image, to which the time stamp and identifier are added, to server 120. Therefore, when acquiring the image from terminal device 110A, server 120 can easily specify the clock time the image is photographed. The clock time indicated by the time stamp is one at which the photographing is actually performed to acquire the image, and the clock time is matched with the photographing clock time indicated by the photographing clock time information when time from photographing start to photographing completion is zero in the still image photographing. When acquiring the image (hereinafter, referred to as a shared image) shared with terminal device 110B from server 120, terminal image processor 115 displays the shared image.

Similarly to terminal device 110A, terminal device 110B synchronizes clock 111b of terminal device 110B with clock 121 of server 120 that is the reference clock. Terminal device 110B acquires the photographing clock time information through the network. Based on the reference clock, namely, clock 111b of terminal device 110B already synchronized with the reference clock, terminal device 110B performs the photographing at the photographing clock time indicated by the photographing clock time information.

Thus, in the first exemplary embodiment, the clocks of the plurality of terminal devices are synchronized with the reference clock, and the plurality of terminal devices perform the photographing at the photographing clock time indicated by the photographing clock time information sent from server 120. Accordingly, the photographing timings can more accurately be matched with each other between the plurality of terminal devices.

FIG. 3 is a block diagram illustrating a configuration of server 120 of the first exemplary embodiment.

Server 120 includes clock 121, server synchronization processor 122, information sender 123, and server image processor 124.

Server synchronization processor 122 sends and receives the packet to and from terminal device 110A to perform processing of synchronizing clock 111a of terminal device 110A with clock 121 of server 120. Server synchronization processor 122 performs the synchronization processing on not only terminal device 110A but also terminal device 110B. Therefore, clocks 111a and 111b of terminal devices 110A and 110B are synchronized with clock 121 of server 120 that is the reference clock.

Information sender 123 sends the photographing clock time information to terminal devices 110A and 110B. Therefore, terminal devices 110A and 110B perform the photographing at the photographing clock time indicated by the photographing clock time information, namely, at the same time.

Server image processor 124 acquires the photographed image from each of terminal devices 110A and 110B. Server image processor 124 sends the image photographed with terminal device 110A to terminal device 110B as the shared image. Otherwise, server image processor 124 sends the image photographed with terminal device 110B to terminal device 110A as the shared image. Otherwise, for example, server image processor 124 generates a three-dimensional image by combining the image photographed with terminal device 110A and the image photographed with terminal device 110B. Server image processor 124 sends the three-dimensional image to terminal devices 110A and 110B as the shared image.

Server image processor 124 of the first exemplary embodiment estimates positions of terminal devices 110A and 110B. Specifically, terminal device 110A sends the plurality of images necessary to estimate the position of terminal device 110A to server 120. The plurality of images are the images photographed with terminal device 110A every time a user turns terminal device 110A toward a different direction. Server image processor 124 estimates the position of terminal device 110A from a size and an orientation of a subject shown in the plurality of images sent from terminal device 110A. Thus, the estimated position of terminal device 110A is used to generate the three-dimensional image. The positions of terminal devices 110A and 110B may be estimated by performing image processing such as feature amount matching using the images photographed with terminal devices 110A and 110B.

FIG. 4A is a flowchart illustrating processing operations of terminal synchronization processor 112 and server synchronization processor 122. Terminal synchronization processor 112 synchronizes clock 111a of terminal device 110A with clock 121 of server 120 using a Network Time Protocol (NTP).

Specifically, terminal synchronization processor 112 of terminal device 110A sends the packet, in which the time stamp indicating the clock time based on clock 111a of terminal device 110A is stored, to server 120 (step S201). The clock time indicated by the time stamp is one at which the packet is sent from terminal device 110A.

When receiving the packet from terminal device 110A, server synchronization processor 122 of server 120 sends back the packet in which the time stamp indicating the clock time based on clock 121 of server 120 to terminal device 110A (step S202). The clock time indicated by the time stamp is one at which the packet is sent from server 120.

Terminal synchronization processor 112 of terminal device 110A calculates a difference between the clock time at time stamp stored in the packet sent back from server 120 and the clock time at the time stamp stored in the packet sent in step S201 as a delay time (step S203). Unless a delay is generated in each of network transmission and processing of responding to the packet in server 120, the delay time is a time difference between clock 111a of terminal device 110A and clock 121 of server 120. Accordingly, terminal synchronization processor 112 of terminal device 110A corrects (for example, adds or subtracts) the clock time at clock 111a of terminal device 110A by the delay time (step S204). That is, terminal device 110A sends the first packet to the server to receive the second packet indicating the clock time based on the reference clock from server 120. Terminal device 110A adjusts clock 111a of terminal device 110A such that the difference between the clock time indicated by the second packet and the clock time, which is based on clock 111a of terminal device 110A in sending the first packet to server 120, becomes zero. Through the adjustment, namely, the correction, terminal device 110A synchronizes clock 111a of terminal device 110A with clock 121 of server 120 that is the reference clock.

Actually, the delay is generated in each of the network transmission and the response processing performed with the server. Accordingly, terminal synchronization processor 112 may calculate the delay time in consideration of these delays. For example, terminal synchronization processor 112 measures clock time Tcs terminal device 110A sends the packet to server 120, clock time Tsr server 120 receives the packet from terminal device 110A, clock time Tss server 120 sends back the packet to terminal device 110A, and clock time Tcr terminal device 110A receives the packet from server 120. The packet sent back from server 120 includes the time stamp indicating clock time Tsr and the time stamp indicating clock time Tss. Then, terminal synchronization processor 112 calculates the delay time by delay time=(Tss+Tsr)/2−(Tcs+Tcr)/2 (step S203).

Although the NTP is used in the first exemplary embodiment, a Real-time Transport Control Protocol (RTCP) may be used. In the RTCP, similarly to the NTP, the time stamp of the terminal device can be stored in the packet. Accordingly, even in the use of the RTCP, similarly to the NTP, the clock of the terminal device can be matched with the clock of the server. The RTCP is a mechanism that is used together with a Real-time Transport Protocol (RTP), and is a mechanism that feeds back a transmission state from a video receiving side to a video sending side. The time stamp on the video receiving side is sent to the video sending side by the RTCP packet together with information indicating actual receiving quality of the video. When receiving the information indicating the receiving quality, like the NTP, the video sending side sends back in which the time stamp indicating clock time Tsr the information is received and the time stamp indicating clock time Tss the response to the information is sent are stored to the video receiving side (in the first exemplary embodiment, terminal device 110A). Terminal device 110A measures the time stamp indicating clock time Tcr the sent-back packet is received. Based on the four time stamps, similarly to the NTP, terminal device 110A calculates the delay time to correct the clock time at clock 111a. The clock time at clock 111a may be corrected using a protocol except for the NTP or RTP.

Thus, clock 111a of terminal device 110A is synchronized with clock 121 of server 120. Similarly, clock 111b of terminal device 110B is synchronized with clock 121 of server 120. The clocks of the terminal devices connected to server 120 through the network are synchronized with clock 121 of server 120 that is the reference clock. That is, the clock time at clock 111a of terminal device 110A is matched with the clock time at clock 111b of terminal device 110B. As a result, the clocks between the terminal devices are synchronized with each other. In other words, the clock times at the clocks of the terminal devices are matched with each other.

The clock synchronization, namely, the clock time adjustment is performed before the photographing (what is called real photographing) of the still image or moving image, which is sent to server 120 for the purpose of the sharing. Therefore, each terminal device can perform the photographing in proper timing, and the image acquired by the photographing can be used to produce the three-dimensional image.

Figure 4B:
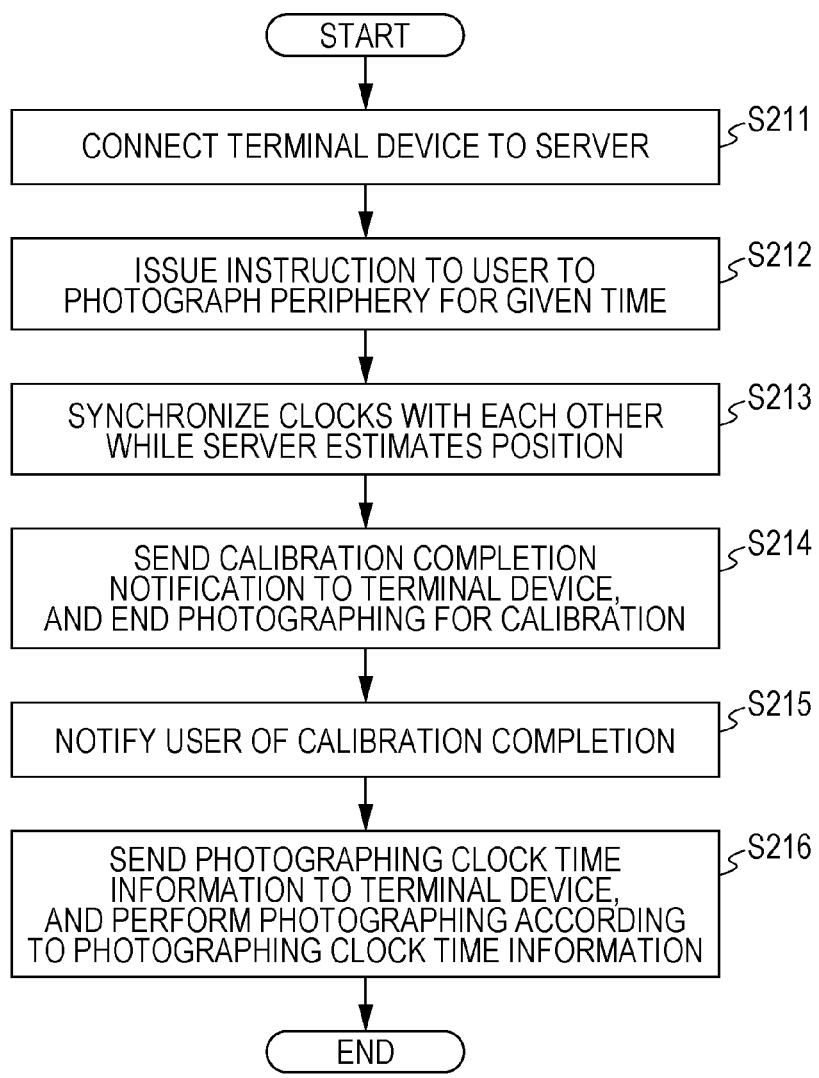
FIG. 4B is a flowchart illustrating a photographing method performed by the terminal device of the first exemplary embodiment.

FIG. 4B is a flowchart illustrating a photographing method performed by terminal device 110A.

For example, a user of terminal device 110A participates in an event such as a photo session. Terminal device 110A is connected to server 120 (step S211). At this point, server 120 may perform user authentication. Then, terminal device 110A issues an instruction to the user to photograph a periphery for a given time (step S212). For example, terminal image processor 115 issues the instruction by displaying a message "Photograph a periphery for a given time". The instruction is issued in order that server 120 estimates the position of terminal device 110A. In response to the instruction, the user performs the photographing (for example, moving image photographing) with terminal device 110A while changing the orientation of terminal device 110A such that the periphery of the user is viewable. At this point, photographing unit 114 of terminal device 110A performs the photographing every time the user turns terminal device 110A toward a different direction. Every time the image (for example, a picture or a frame) is acquired by the photographing, terminal image processor 115 of terminal device 110A sends the image to server 120. Server image processor 124 of server 120 estimates the position of terminal device 110A based on the images sent from terminal device 110A.

In step S212, when issuing the instruction to the user, terminal device 110A may issue the instruction to include a landmark to be a sign in the subject. Therefore, accuracy of position estimation performed with server 120 can be improved. For example, in the case that the user is in a ball park, terminal device 110A issues an instruction to include a diamond constructed with a home base, a first base, a second base, and a third base in the subject. Otherwise, terminal device 110A issues an instruction to photograph an electric scoreboard of the ball park. In the case that the user is in a soccer field, terminal device 110A issues an instruction to photograph a characteristic object such as a goal, a penalty area, and a center circle.

Terminal synchronization processor 112 of terminal device 110A synchronizes clock 111a of terminal device 110A with clock 121 of server 120 using the NTP or RTCP technique while the position is estimated (for example, several seconds) (step S213). That is, terminal device 110A synchronizes own clock 111a with clock 121 of server 120 according to the flowchart in FIG. 4A.

When calibration that is processing including the clock synchronization and the position estimation is completed, server 120 sends a notification (calibration completion notification) indicating the calibration completion to terminal device 110A. When receiving the calibration completion notification, terminal device 110A interrupts the photographing that is performed with photographing unit 114 for the purpose of the calibration (step S214). Terminal device 110A notifies the user of the calibration completion (step S215). For example, terminal image processor 115 makes the notification by displaying a message "Calibration is completed. Normal use is available". User cooperation such that the user changes the orientation of terminal device 110A is needed for the calibration. Accordingly, the user can receive the notification to recognize that the necessity of the cooperation is eliminated.

Then, information sender 123 of server 120 sends the photographing clock time information to terminal device 110A. When receiving the photographing clock time information, information acquisition unit 113 of terminal device 110A causes photographing unit 114 to perform the photographing at the photographing clock time indicated by the photographing clock time information (step S216). The photographing performed at this time is not the photographing performed to estimate the position, but the photographing (what is called real photographing) performed to acquire the desired image by the user. When performing the moving image photographing, photographing unit 114 deals with the photographing clock time as the photographing start clock time, and starts the moving image photographing at a predetermined frame rate from the photographing start clock time.

Thus, in the first exemplary embodiment, because a waiting time is generated in synchronizing the clocks with each other, terminal device 110A causes server 120 to estimate the position in the waiting time. In the photographing that is performed with the plurality of terminal devices in order to generate the three-dimensional image, it is necessary to estimate the position of the terminal device. Accordingly, in step S213, the user causes terminal device 110A to perform the photographing such that the periphery is viewed, allowing the estimation of the position of terminal device 110A. In the case that terminal device 110A has ability to move photographing unit 114 (camera) like a monitoring camera, the photographing is automatically performed such that the periphery is viewed. In the case that terminal device 110A is a camera, a video camera, or a portable terminal, which is carried on with the user, the instruction is issued to the user to photograph the periphery.

Figure 5:
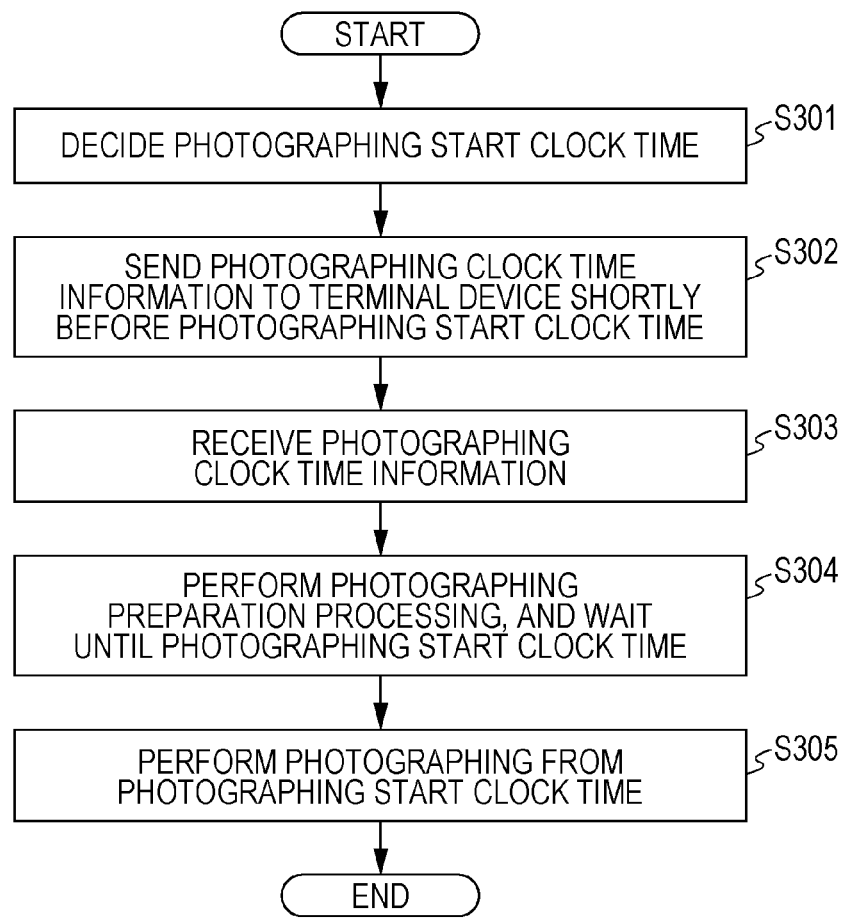
FIG. 5 is a flowchart illustrating processing operations of the server and terminal device of the first exemplary embodiment in order to perform real photographing.

FIG. 5 is a flowchart illustrating processing operations of server 120 and terminal device 110A in order to perform the photographing (real photographing). FIG. 5 illustrates the detailed processing operation in step S216 of FIG. 4B.

It is assumed that a network transmission delay between server 120 and the terminal device frequently depends on the ability of the terminal device. For example, communication through Wi-Fi (registered trademark) differs from radio communication such as 3G and Long Term Evolution (LTE) in a response speed and a communication speed. In a way to simultaneously send a photographing start instruction packet from server 120 to all the terminal device, a deviation of the photographing timing occurs in each terminal device. Therefore, in the case that the real photographing is the moving image photographing, server 120 sends the photographing clock time information indicating such the specific photographing start clock time that the photographing is started from X:Y:Z to each terminal device at a time point shortly before the photographing start clock time. X is integers of 0 to 23, and each of Y and Z is integers of 0 to 59. The specific description will be made below.

Server 120 decides the photographing start clock time of terminal device 110A as the photographing clock time (step S301). For example, the photographing start clock time is a moving image photographing start clock time, and is a clock time that is decided such that the photographing timing of another terminal device (for example, terminal device 110B) already performing the moving image photographing is synchronized with the photographing timing of terminal device 110A. Server 120 may decide the photographing frame rate in addition to the photographing start clock time. Server 120 may decide the photographing start clock time and the frame rate after exchanging information about the ability such as the frame rate and image resolution with terminal device 110A.

Server 120 sends the photographing clock time information indicating the photographing start clock time to terminal device 110A at a clock time shortly before the photographing start clock time (step S302). The clock time shortly before the photographing start clock time means time in consideration of the network transmission delay and the photographing start delay. Then terminal device 110A receives the photographing clock time information (step S303). Terminal device 110A performs preparation processing of photographing unit 114 to cause photographing unit 114 to wait until the photographing start clock time indicated by the photographing clock time information (step S304). Specifically, in the case that the processing of photographing unit 114 is performed by software, terminal device 110A causes the software to sleep only for time remaining until the photographing start clock time, or makes a registration in a timer table such that the software is started at the photographing start clock time. When the current clock time based on clock 111a reaches the photographing start clock time, photographing unit 114 starts the photographing (step S305). The preparation processing of photographing unit 114 depends on the terminal device. Accordingly, when terminal device 110A previously performs the preparation processing in step S304, the photographing timings of the plurality of terminal devices are effectively matched with each other.

At this point, even if a trigger for the photographing is generated at the photographing start clock time, sometimes a delay is generated until the photographing is actually performed since the photographing start clock time. Specifically, in the case that the trigger is provided by the software, there is a delay from the trigger generation to the actual operation of the physical or optical system of photographing unit 114. The delay includes a delay that changes according to a situation and a delay peculiar to the software or device of the terminal device or photographing unit 114. Hereinafter, a delay time that changes according to a situation is referred to as a varying delay time, and a delay time peculiar to the software or device is referred to as a peculiar delay time. Time including the varying delay time and the peculiar delay time is referred to as a photographing delay time.

Each terminal device included in terminal device 110A sends information indicating a model of the own terminal device or photographing unit to server 120. Server 120 refers to a table indicating the peculiar delay time of each model, and specifies the peculiar delay time corresponding to the model indicated by the sent information. Server 120 notifies the terminal device of the peculiar delay time specified with respect to the terminal device. The varying delay time depends on an amount of light incident on an optical system or the resolution of the image, and the varying delay time also depends on whether the terminal device stands still or moves. Accordingly, each terminal device acquires a parameter indicating a situation or an environment, and acquires the varying delay time from the server according to the parameter.

In this case, each terminal device derives the photographing delay time from the peculiar delay time and the varying delay time. For example, each terminal device derives the photographing delay time by adding the peculiar delay time and the varying delay time to each other. Otherwise, each terminal device derives longer one of the peculiar delay time and the varying delay time as the photographing delay time. When receiving the photographing clock time information, the terminal device activates from a sleep state at a time point earlier than the photographing clock time indicated by the photographing clock time information by the derived photographing delay time (that is, performs timer activation), and performs the photographing.

That is, terminal device 110A specifies a photographing delay time until the photographing is performed since photographing start of the first terminal device 110A, and the photographing is started at a clock time earlier than the photographing clock time indicated by the photographing clock time information by the photographing delay time. Therefore, the photographing can be performed in timing more accurately matched with the photographing clock time based on the reference clock without being influenced by various physical factors.

The peculiar delay time may be measured as follows. That is, the clock of terminal device R in which the peculiar delay time is already known and the clock of terminal device X that is a measurement target of the peculiar delay time are synchronized with each other using the NTP. The identical photographing clock time is assigned to terminal devices R and X, and terminal devices R and X are caused to perform the photographing in the identical situation or environment. At this point, a timepiece (for example, a stopwatch) in which the clock time is displayed with high accuracy is photographed as a photographing target. The difference between the clock time shown in the image acquired with terminal device R and the clock time shown in the image acquired with terminal device X is added to or subtracted from the already-known peculiar delay time of terminal device R to be able to derive the peculiar delay time of terminal device X. The clock synchronization using the NTP or the like may be eliminated. In order to reduce an error of the measured or derived peculiar delay time, the peculiar delay time may repeatedly be derived, an error value may be removed, or the repeatedly-derived peculiar delay time may be averaged. A service provider, a terminal device manufacturer, or a terminal device owner may previously perform the measurement.

Thus, in the first exemplary embodiment, the clock time at the clock of each terminal device is matched with the clock time at the clock of server 120 that is the reference. Accordingly, each terminal device can perform the photographing at the identical clock time without being influenced by the network transmission delay or the photographing delay time of the terminal device.

A Global Positioning System (GPS) timepiece or an atomic timepiece is used as clock 121 of server 120, and clock 121 may be set to a world reference timepiece. In this case, clock 111a of terminal device 110A is not directly synchronized with clock 121 of server 120, but clock 111*a* may be synchronized with any other clock synchronized with the world reference timepiece. For example, the reference clock is clock 111*b* included in terminal device 110B, and terminal device 110A synchronizes own clock 111*a* with clock 111*b* of terminal device 110B.

Terminal device 110A may start the synchronization of clock 111*a* not immediately before the photographing but after a predetermined time elapses since the photographing start. Therefore, a burden on terminal device 110A can be reduced during a rising phase, and the photographing can smoothly be started.

The photographing clock time information may include a photographing end clock time. Therefore, terminal devices 110A and 110B can simultaneously end the photographing in synchronization with the photographing end clock time. Terminal devices 110A and 110B may send photographing video to server 120 in real time. The photographing video may temporarily be stored in local disks of terminal devices 110A and 110B, and sent to server 120 after the photographing end.

Second Exemplary Embodiment

As described in the first exemplary embodiment, the terminal device performs the clock synchronization, and the photographing is started at the clock time earlier than the photographing clock time by the photographing delay time, which allows the actual photographing clock times at the plurality of terminal devices to be accurately matched with each other. However, sometimes the synchronization is not still achieved due to various hard-to-predict external factors.

Therefore, in a method according to a second exemplary embodiment, whether the photographing synchronization is achieved, and how much time the photographing timing deviates are directly detected unless the photographing synchronization is achieved. That is, in the second exemplary embodiment, a time piece or the like is photographed, the clock time shown in the image acquired by the photographing and the clock time at the clock of the terminal device are compared to each other to directly detect the deviation of the photographing timing. The second exemplary embodiment will specifically be described below.

FIG. 6 is a view illustrating a photographing system that performs the photographing by a photographing method of the second exemplary embodiment.

The photographing system of the second exemplary embodiment includes a plurality of terminal devices 110C, server 120C, and display device 130. For convenience, only one terminal device 110C is illustrated in FIG. 6. In components included in the photographing system of the second exemplary embodiment, because the component designated by the same reference numeral as the first exemplary embodiment is identical to the component of first exemplary embodiment, the detailed description is omitted.

Server 120C includes clock 121 that is the reference clock, server synchronization processor 122*c*, information sender 123, and server image processor 124. Server synchronization processor 122*c* performs processing of synchronizing photographing system clock 111*c* of terminal device 110C with clock 121 of server 120 by such a technique as the NTP. Server synchronization processor 122*c* includes time code coder 125, time code detection decoder 126, and delay time deriver 127.

Time code coder 125 codes current clock time TSSVR based on clock 121 of server 120 into the time code in each predetermined period. For example, the time code is a two-dimensional code, such as a QR code (registered trademark), which indicates the clock time. The time code may be any image constructed with a pattern, a character, a numerical character, or a symbol as long as the time code visually indicates the clock time. Every time the time code is generated by coding, the time code is sent to display device 130 at any time, and displayed while continuously switched.

At this point, display device 130 can display any image, and temporally change the image. More specifically, display device 130 is not a general printed matter, but a liquid crystal, a cathode ray tube, a large-screen LED device, a light emitting device, a device that displays a light wave signal in a range outside visible light (typically, a near infrared image, a far infrared image, a micro-radar image, or an X-ray image), and the like. Any timepiece that performs mechanical or physical operation may be used instead of display device 130 as long as the timepiece has a function of displaying the clock time. However, for a general timepiece, a second hand is a minimum display unit, but the clock time can hardly be displayed in a period shorter than a second unit. For this reason, the synchronization accuracy is hardly enhanced. Therefore, the use of the timepiece having the function of displaying the clock time with accuracy of one-tenth second or one-thousandth second can enhance the synchronization accuracy. When the timepiece is a digital timepiece, the digital timepiece has the function of displaying the clock time with accuracy of one-tenth second. When the timepiece is an analog timepiece, the analog timepiece has the function of moving a hand such that the clock time is visible with accuracy of one-tenth second.

Display device 130 displays clock time TSSVR at clock 121 of server 120 TSSVR in the terms of the time code.

Time code detection decoder 126 acquires the image photographed with terminal device 110C. Time code detection decoder 126 specifies clock time TSSVR indicated by the time code by decoding the time code shown in the image.

Delay time deriver 127 acquires clock time TSSVR of the time code specified with time code detection decoder 126 and clock time TSCAP at which the terminal device 110C performs the photographing based on photographing system clock 111*c* of terminal device 110C. Delay time deriver 127 derives the difference between clock time TSSVR and clock time TSCAP as the delay time, and sends delay time information indicating the delay time to terminal device 110C.

Terminal device 110C includes clock 111*a*, photographing system clock 111*c*, terminal synchronization processor 112*c*, information acquisition unit 113, photographing unit 114*c*, and terminal image processor 115.

Photographing system clock 111*c* is a clock dedicated to the photographing unlike clock 111*a* used as the system clock. For example, photographing system clock 111*c* is initialized so as to match with the system clock in starting terminal device 110C or restarting an Operating System (OS) of terminal device 110C. That is, photographing system clock 111*c* is a photographing clock that is managed based on the system clock of terminal device 110C. In the case that the photographing delay time of terminal device 110C is previously recognized, the clock time at photographing system clock 111*c* may be set ahead the delay time compared with the system clock.

Sometimes the system clock of the terminal device 110C can hardly be corrected due to a restriction of the OS or the like. Even if the system clock of the terminal device 110C can be corrected, sometimes the system clock had better not be corrected in order to avoid the influence on other operating services except for the photographing. Therefore, photographing system clock 111c is included. Photographing system clock 111c is a clock (what is called a virtual clock) that is operated in terminal device 110C while limited to software for the photographing. In the second exemplary embodiment, the delay time between photographing system clock 111c and clock 121 of server 120C is calculated, and the clock time at photographing system clock 111c is corrected by the delay time. Alternatively, the delay time between clock 111a that is the system clock and clock 121 of server 120C is calculated, and the clock time at photographing system clock 111c may be adjusted to the clock time that is obtained by correcting the clock time at clock 111a by the delay time.

Thus, in the second exemplary embodiment, terminal device 110C that is the first terminal device synchronizes photographing system clock 111c that is managed based on the system clock (that is, clock 111a) of terminal device 110C with the reference clock (that is, clock 121 of server 120C).

Photographing unit 114c photographs the time code displayed on display device 130 based on an instruction issued from terminal synchronization processor 112c, and outputs the image (hereinafter, referred to as a time code photographing image) acquired by the photographing to terminal synchronization processor 112c.

Similarly to photographing unit 114 of the first exemplary embodiment, photographing unit 114c performs the photographing at the photographing clock time indicated by the acquired photographing clock time information based on photographing system clock 111c already synchronized with clock 121 of server 120C. When performing the moving image photographing, photographing unit 114c deals with the photographing clock time as the photographing start clock time, and starts the moving image photographing at a predetermined frame rate from the photographing start clock time.

Terminal synchronization processor 112c specifies clock time TSCAP photographing unit 114c photographs the time code based on photographing system clock 111c, and sends clock time TSCAP to server 120. When acquiring the delay time information from server 120C, terminal synchronization processor 112c corrects the clock time at photographing system clock 111c by the delay time indicated by the delay time information. Therefore, photographing system clock 111c is synchronized with clock 121 of server 120C.

Terminal image processor 115 sends an image photographed with photographing unit 114c to server 120C. When sending the image to server 120C, terminal image processor 115 adds the clock time, at which the photographing is performed to acquire the image is acquired based on corrected photographing system clock 111c, to the image as a time stamp. Terminal image processor 115 adds an identifier to the image in order to identify the terminal device (specifically, terminal device 110C) that performs the photographing to acquire the image. Terminal image processor 115 sends the image to which the time stamp and identifier are added to server 120C. The clock time indicated by the time stamp is one at which the photographing is actually performed to acquire the image, and the clock time is matched with the photographing clock time indicated by the photographing clock time information when time from photographing start to photographing completion is zero in the still image photographing. When acquiring the shared image shared with other terminal devices from server 120C, terminal image processor 115 displays the shared image.

That is, in the second exemplary embodiment, terminal device 110C causes photographing unit 114c to photograph the time code displayed on display device 130, and acquires a time code photographing image by the photographing. For example, when a relationship of clock time TSSVR>clock time TSCAP holds between clock time TSCAP terminal device 110C performs the photographing and clock time TSSVR specified from the time code shown in the time code photographing image, clock time TSCAP is delayed compared with clock time TSSVR. At this point, clock time TSCAP is a clock time based on photographing system clock 111c with which the photographing is performed, and clock time TSSVR is a clock time based on clock 121 of server 120 at a time point when the photographing is performed. Accordingly, photographing system clock 111c is delayed compared with clock 121 of server 120 that is the reference clock. Specifically, when clock time TSCAP is 0.100 second while clock time TSSVR is 0.400 second, photographing system clock 111c loses 0.300 second compared with clock 121 of server 120.

Terminal device 110C sets photographing system clock 111c ahead the delay time. That is, photographing system clock 111c is corrected (or adjusted). Therefore, photographing system clock 111c is synchronized with clock 121 of server 120. After the correction, unless time necessary for the operation of terminal device 110C varies, photographing system clock 111c of terminal device 110C and clock 121 of server 120 are always synchronized with each other. Therefore, a relationship of clock time TSSVR=clock time TSCAP holds.

Terminal device 110C of the second exemplary embodiment may perform the photographing according to the flowchart in FIG. 4B. At this point, before the real photographing, terminal device 110C corrects photographing system clock 111c in step S213 as the processing included in the calibration. For example, according to the instruction in step S212, terminal device 110C photographs the periphery for a given time in step S213 such that the time code displayed on display device 130 constructed as the electric scoreboard of the ball park is included in the subject. For the long real photographing time, photographing system clocks 111c may be corrected (that is, synchronized with each other) on a regular basis.

Thus, in the second exemplary embodiment, the plurality of terminal devices 110C photograph display device 130 to correct photographing system clocks 111c of the plurality of terminal devices 110C. Accordingly, based on the time code displayed on display device 130, photographing system clocks 111c of the plurality of terminal devices 110C can be synchronized with each other. In other words, in the second exemplary embodiment, terminal device 110C photographs the subject in which the updated clock time is displayed every time the clock time based on the reference clock is updated. Terminal device 110C adjusts photographing system clock 111c of terminal device 110C such that the difference between the clock time the subject is photographed based on photographing system clock 111c of terminal device 110C and the clock time shown in the time code photographing image acquired by photographing the subject becomes zero. Therefore, terminal device 110C synchronizes own photographing system clock 111c with the reference clock. Accordingly, the clock time the photographing is actually performed based on the reference clock is shown in the image, so that photographing system clock 111c of terminal device 110C can more easily and more correctly be synchronized with the reference clock.

At this point, photographing system clock 111c is different from clock 111a that is the system clock of terminal device 110C. Because existence of two clocks in one terminal device becomes complicated, the system clock may also be corrected at the same time. However, there is a possibility of using the system clock in another purpose except for the photographing. Therefore, desirably the system clock is not corrected, but only photographing system clock 111c independently used for the purpose of the photographing is corrected.

In the second exemplary embodiment, display device 130 that is the subject displays the clock time updated based on the reference clock as the QR code. The clock time may be displayed as not only the QR code but also a one-dimensional code or a two-dimensional code.

FIG. 7 is a flowchart illustrating synchronization processing of terminal synchronization processor 112c and server synchronization processor 122c.

Time code coder 125 of server 120 acquires current clock time TSSVR based on clock 121 (step S501), and codes clock time TSSVR into the time code (step S502). Display device 130 acquires and displays the time code (step S503).

Photographing unit 114c of terminal device 110C performs the photographing such that the displayed time code is included in the subject. At this point, terminal synchronization processor 112c acquires clock time TSCAP based on photographing system clock 111c at a time point when the photographing is performed (step S504). Terminal synchronization processor 112c sends the time code photographing image acquired by the photographing and clock time TSCAP to server 120.

Time code detection decoder 126 of server 120 detects clock time TSSVR from the time code photographing image. Then, delay time deriver 127 of server 120 calculates the delay time using clock time TSSVR-clock time TSCAP (step S505). Delay time deriver 127 sends the delay time information indicating the delay time to terminal device 110C.

Based on delay time information, terminal synchronization processor 112c of terminal device 110C corrects the clock time at photographing system clock 111c such that the delay time becomes zero (step S506).

In the second exemplary embodiment, the clock time at photographing system clock 111c is corrected. Alternatively, the clock time needs not to be corrected. That is, server 120 holds the calculated delay time of terminal device 110C, and sends the photographing clock time information indicating the clock time earlier than the photographing clock time by the delay time to terminal device 110C when the photographing clock time is decided. Therefore, the delay time is canceled, and terminal device 110C can be caused to perform the photographing at the decided photographing clock time. In this case, terminal device 110C needs not to include photographing system clock 111c.

Sometimes a delay is generated in a period from the processing in step S501 to the processing in step S503, namely, until clock time TSSVR is displayed as the time code since clock time TSSVR at clock 121 of server 120C is acquired. In such cases, time code coder 125 may code the clock time in which time necessary for the delay is added to clock time TSSVR into the time code. Therefore, the clock time of the time code displayed on display device 130 can strictly be matched with the clock time at clock 121 of server 120C.

The time code of the second exemplary embodiment will be described below. Specifically, the time code of the second exemplary embodiment is a QR code (registered trademark) having an error resilience.

Figure 8A:
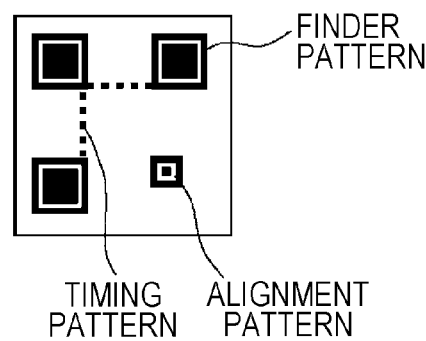
FIG. 8A is a view illustrating a QR code that is an example of a time code of the second exemplary embodiment.

FIG. 8A is a view illustrating the QR code. As illustrated in FIG. 8A, the QR code is constructed with three finder patterns, a timing pattern, an alignment pattern, and a coded data portion. The three finder patterns are used to detect the code. The timing pattern is one in which black and white dots are repeatedly arrayed in line, and a pitch between the dots is specified by the timing pattern. The alignment pattern is one in which modules are disposed at constant intervals, and a deformation amount of the QR code is specified by the alignment pattern. The data portion is an error-correctable code (having redundancy) that is acquired by coding original data.

The time code of the second exemplary embodiment is the QR code having detection easiness, a deformation resistance, and error correctable ability. Because the time code of the second exemplary embodiment is simultaneously photographed with the plurality of terminal devices, it is assumed that the time code is photographed from an oblique direction or a distant place. Accordingly, the QR code is used as the time code of the second exemplary embodiment, which allows the generation of the error to be suppressed in detecting the clock time from the time code.

FIGS. 8B to 8E are views illustrating other examples of the time code of the second exemplary embodiment.

Figure 8B:
FIG. 8B is a view illustrating another example of the time code of the second exemplary embodiment.
Figure 8C:
FIG. 8C is a view illustrating another example of the time code of the second exemplary embodiment.
Figure 8D:
FIG. 8D is a view illustrating another example of the time code of the second exemplary embodiment.

For example, the time code of the second exemplary embodiment may be codes such as laterally-elongated QR codes as illustrated in FIGS. 8B to 8D. That is, the time code in the second exemplary embodiment may be a rectangle in which a horizontal width is longer than a vertical width. For example, the time code in FIG. 8B includes two finder patterns arrayed in a horizontal direction, and a longitudinal length (vertical height) of the time code is equal to a longitudinal length of the finder pattern.

Because the time codes in FIGS. 8B to 8D have the laterally-elongated rectangle, the time codes have a strong error resistance against the photographing from a horizontally wide angle. That is, the time codes have the deformation resistance and a pitch detecting function. Even if the time code is photographed so as to be surrounded by the plurality of terminal devices 110C, each terminal device 110C can properly specify the clock time indicated by the time code. Because the time code is short in the vertical direction, the time code can be inconspicuous.

As illustrated in FIG. 8C, the time code may include only one finder pattern. In the time code in FIG. 8C, one of the finder patterns included in the time code in FIG. 8B is eliminated, and only the other finder pattern exists.

In a usual QR code, a dot (cell) has a square shape. However, as illustrated in FIG. 8D, the time code in the second exemplary embodiment may be constructed with the dot (cell) having a laterally-elongated rectangular shape. Therefore, the horizontal deformation resistance can further be enhanced.

Figure 8E:
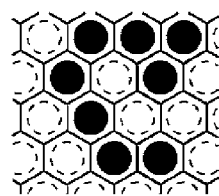
FIG. 8E is a view illustrating another example of the time code of the second exemplary embodiment.

Because the time code of the second exemplary embodiment is desirably inconspicuous, the time code may be constructed with not the black and white dot patter having the square lattice, but a hexagonal pattern in FIG. 8E. Specifically, in the time code, a dot coordinate deviates horizontally by a half dot in each line. The dot shape is not the square but the hexagon. Thus, the time code is formed into the hexagonal lattice, which allows a human to have a less feeling of discomfort when seeing the time code compared with the square lattice. In the square-lattice code, a distance between vertical or horizontal dots is shorter than a distance between oblique dots. Therefore, misrecognition is easily generated between the vertical or horizontal dots. Specifically, in specifying the dot, sometimes a dot next to the dot in question is referred to. On the other hand, in the hexagonal-lattice code, a distance between the dot and each six adjacent dots is substantially equal. Accordingly, a misrecognition rate is equal in each direction, but a conspicuous direction does not exist from the viewpoint of misrecognition.

A minimum time unit that can be expressed by the time code will be described below. A second is the minimum time unit in a general timepiece. In the second exemplary embodiment, in order that the synchronization error falls within one millisecond, the clock time indicated in the time code has accuracy of one millisecond, and the time code is updated and displayed in a period of one millisecond.

FIGS. 9A to 9C are views illustrating other examples of the time code of the second exemplary embodiment.

For example, as illustrated in FIG. 9A, the time code has a shape like the laterally-elongated QR code, and expresses the clock time having the accuracy of one-millisecond unit. The time code is updated and displayed in each period of one millisecond. In order to properly photograph the time code updated in a short period, it is necessary for the terminal device to have a special function such as a high-speed camera.

Therefore, in the second exemplary embodiment, the clock time may be coded while divided into places expressing the clock time. For example, when the clock time of "a.bcd" second is coded, "a", "b", "c", and "d" are independently coded as illustrated in FIG. 9B. Each of a, b, c, and d is one of numerical values of 0 to 9. In other words, when the clock time constructed with the numerical value of a second place, the numerical value of a one-tenth second place, the numerical value of a one-hundredth second place, and the numerical value of a one-thousandth second place is coded, the numerical value of the second place is coded, the numerical value of the one-tenth second place is coded, the numerical value of the one-hundredth second place is coded, and the numerical value of the one-thousandth second place is coded. The time code in FIG. 9B is constructed with the codes acquired by the coding while the codes are horizontally arrayed. Each code is constructed as a horizontally-arrayed dot pattern. Each code is independently decoded.

Therefore, the code of the second place is updated and displayed in units of seconds, the code of the one-tenth second place is updated and displayed in units of one-tenth seconds, the code of the one-hundredth second place is updated and displayed in units of one-hundredth seconds, and the code of the one-thousandth second place is updated and displayed in units of one-thousandth seconds. In the good-responsiveness terminal device having the special function such as the high-speed camera, the codes can correctly be decoded from the code of the second place to the code of the one-thousandth second place. In a terminal device having the less responsiveness than the above terminal device, although the code of the one-thousandth second place can hardly be decoded, for example, the code of the one-tenth second place and the code of the second place can be decoded.

In the time code in FIG. 9B, the finder pattern, version information, size, and error resistance strength information are added to each code. Alternatively, these pieces of information need not to be added to each code. As illustrated in FIG. 9C, the time code has one finder pattern, one piece of information, and one size, and one piece of error resistance strength information. For example, these pieces of information are commonly used in each code. Therefore, a surface area of the time code can be reduced. When the alignment patterns are disposed at constant interval in the time code, the deformation of the time code can easily be detected. For the long time code, a plurality of alignment patterns may be disposed in the time code.

Thus, in the second exemplary embodiment, the clock time may be coded while divided into the numerical values of the places. That is, the numerical value of each place expressing the clock time based on the reference clock is individually coded, and the coded numerical value of each place may be displayed in display device 130 that is the subject. At this point, in the numerical values of the places, the numerical value of a first place (for example, the numerical value of one-thousandth second place) is updated, coded, and displayed every time the clock time is updated based on the reference clock, for example, in each one-thousand second. In the numerical values of the places, the numerical value of a second place (for example, the numerical value of one-hundredth second place) is updated, coded, and displayed every time the clock time is updated N times (for example, ten times). Therefore, even if the terminal device has any responsiveness, the terminal device can detect the clock time with accuracy corresponding to the responsiveness. By way of example, the clock time is coded while divided into the numerical values of the places. Alternatively, the clock time may be coded while divided in any way. For example, the clock time may be coded while divided into the numerical value of the second place, the numerical value of a minute place, and the numerical value of an hour place. The elapsed time is expressed by a number base N from the beginning of one day, and the elapsed time may be coded while divided into the numerical values of the places. Because pieces of information such as date, hour, and minute are easily acquired from something except for the time code, for example, only the numerical values of second place or less or only the numerical values less than the second place may be coded. The time code may include identification information indicating an expression form (such as a starting point of the clock time and a unit of the clock time) of the clock time. The time code may include additional information indicating a range of the place of the coded clock time.

Variation

In the first and second exemplary embodiments, in the case that the photographing unit performs the moving image photographing during the real photographing, terminal image processor 115 sequentially sends all the frames acquired with the photographing unit to the server. In a variation, in order to reduce an amount of data transferred to the server, terminal image processor 115 interleaves the frames acquired by the photographing, and sends only some frames to the server. Therefore, the amount of data transferred to the server can be reduced.

Figure 10:
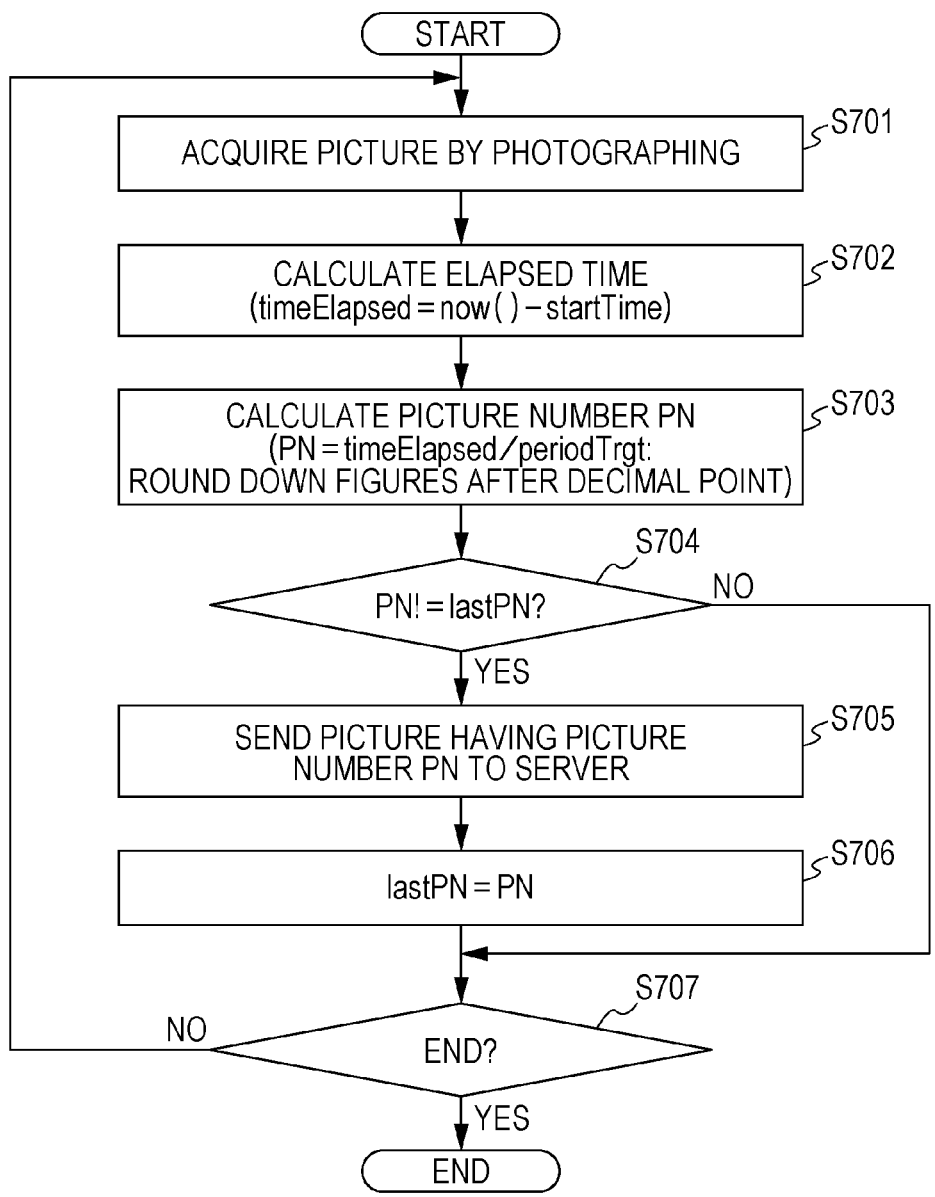
FIG. 10 is a flowchart illustrating a processing operation of a terminal image processor according to a variation.

FIG. 10 is a flowchart illustrating a processing operation of terminal image processor 115 of the variation. For example, photographing unit (photographing unit 114 or photographing unit 114c) performs the moving image photographing at a frame rate of 30 fps or 60 fps. In this case, the image is generated as the frame in a period of 33 or 16.5 milliseconds. The image acquired with the photographing unit is not limited to the frame in a narrow sense, but the image may be any picture. The image acquired with the photographing unit will be described below as the picture.

Terminal image processor 115 acquires the picture generated by the photographing from the photographing unit (step S701). Then, terminal image processor 115 calculates the elapsed time until the clock time the picture is acquired since the photographing start clock time indicated by the photographing clock time information (step S702). For the moving image photographing, the photographing clock time indicated by the photographing clock time information is dealt with as the photographing start clock time. The clock time the picture is acquired is a clock time based on clock 111a or clock 111c. Assuming that startTime is the photographing start clock time and that now( ) is the clock time the picture is acquired, terminal image processor 115 calculates the elapsed time using timeElapsed=now( )–startTime.

Then, terminal image processor 115 calculates picture number PN of the picture acquired in step S701 (step S703). At this point, terminal image processor 115 uses a time interval (periodTrgt) previously acquired from server image processor 124 of the server (server 120 or server 120C). That is, terminal image processor 115 calculates an integral portion of a quotient acquired by dividing timeElapsed by periodTrgt as picture number PN.

Terminal image processor 115 judges whether picture number PN is different from a final picture number (lastPN) (step S704). The final picture number is initialized to "−1" before the processing in step S701. When picture number PN is judged to be different from the final picture number (Y in step S704), terminal image processor 115 sends the picture having picture number PN to the server (step S705). Terminal image processor 115 updates the final picture number (lastPN) to picture number PN (step S706).

When picture number PN is judged to be equal to the final picture number in step S704 (N in step S704), or after the processing in step S706, terminal image processor 115 judges whether the moving image photographing of the photographing unit is ended (step S707). When judging that the moving image photographing is ended (Y in step S707), terminal image processor 115 ends the processing of sending the picture to the server. On the other hand, when judging that the moving image photographing is not ended (N in step S707), terminal image processor 115 repeats the pieces of processing from step S701.

In the variation, the terminal device starts the moving image photographing from the photographing clock time indicated by the photographing clock time information, and sends only the picture, which is acquired in the second period longer than the first period in the pictures acquired by the moving image photographing in each first period, to the server. The terminal device is the first terminal device, and may be one of terminal devices 110A, 110B, and 110C of the first and second exemplary embodiments. The first period is an inverse number of the frame rate of the moving image photographing performed with the photographing unit of the terminal device, and the second period is the time interval (periodTrgt). The terminal device acquires the period information indicating the second period from the server. Accordingly, the terminal device selects only the picture, which is acquired in each second period indicated by the acquired period information in the pictures acquired in each first period, and sends the selected picture to the server.

Even if the pictures are sequentially generated with the photographing unit in a shorter period, the terminal device can select only the picture sequentially generated in the long period (periodTrgt) of which the terminal device selects is notified by the server in the pictures, and send the selected picture to the server. Even if the photographing unit performs the moving image photographing at a high frame rate such as 30 fps, the frame rate of the moving image sent to the server can be suppressed to a lower level such as 10 fps or 1 fps. Accordingly, the amount of data transferred to the server can be reduced.

Sometimes, due to a factor such as a battery of the terminal device (one of terminal devices 110A to 110C), timing of photographing one picture varies or the picture photographing lacks during the moving image photographing performed with the terminal device. Even if the plurality of terminal devices simultaneously start the moving image photographing according to the photographing clock time information, sometimes the timing of photographing one picture with the plurality of terminal devices varies during the moving image photographing.

However, in the variation, the rapid decrease of the battery of the terminal device can be prevented because the frame rate of the moving image sent to the server can be suppressed to a lower level. As a result, the plurality of terminal devices are notified of the common time interval (periodTrgt), which allows the variation of the photographing timing to be suppressed in the plurality of terminal devices.

Although the image processing methods according to one or the plurality of aspects are described above based on the first and second exemplary embodiments and the variation, the present disclosure is not limited to the first and second exemplary embodiment and the variation. Various modifications can be made by those skilled in the art without departing from the scope of the present disclosure, and an aspect constructed by a combination of the constituents of the different exemplary embodiments and the variation may also be included in one or a plurality of aspects of the present disclosure.

Figure 11:
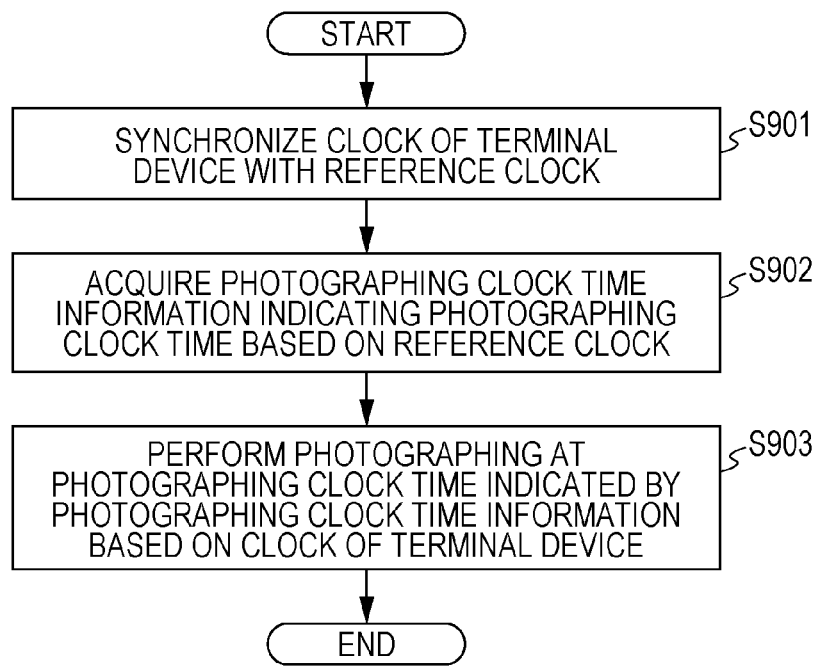
FIG. 11 is a flowchart illustrating a photographing method according to one aspect of the present disclosure.

For example, the photographing method of one aspect of the present disclosure may be a photographing method expressed by a flowchart in FIG. 11.

FIG. 11 is a flowchart illustrating the photographing method of one aspect of the present disclosure.

The photographing method of one aspect of the present disclosure is a photographing method in which the terminal device performs the photographing, and pieces of processing in steps S901 to S903 are performed. The terminal device is one of terminal devices 110A to 110C. In step S901, the terminal device synchronizes the own clock with the reference clock. For example, the reference clock is clock 121 included in server 120. The reference clock may be a clock included in another terminal device or device. In step S902, the terminal device acquires the photographing clock time information indicating the photographing clock time based on the reference clock from server 120 through the communication network. In step S903, the terminal device performs the photographing at the photographing clock time indicated by the photographing clock time information based on the clock of the terminal device already synchronized with the reference clock.

Because the clock of the terminal device is previously synchronized with the reference clock, when the photographing clock time information is acquired shortly before the photographing clock time, the photographing can be performed in timing accurately matched with the photographing clock time based on the reference clock. Accordingly, the photographing clock time can easily be matched with the desired timing with high accuracy.

In each of the first and second exemplary embodiments and the variation, each constituent may be constructed with dedicated hardware or constructed by executing a software program suitable for each constituent. A program executing unit such as a CPU and a processor reads and executes the software program stored in a hard disk drive or a recording medium such as a semiconductor memory, whereby each constituent may be constructed. At this point, the software implementing the terminal device of the first and second exemplary embodiments and the variation is a program that causes a computer to execute each step of the flowchart in FIG. 11.

In the first exemplary embodiment, terminal device 110A synchronizes clock 111a with the reference clock using the techniques such as the NTP. After the synchronization, the time code of the second exemplary embodiment may be photographed. Terminal device 110A may more accurately synchronize clock 111a with the reference clock by the time code photographing. In the first exemplary embodiment, each of terminal devices R and X is caused to photograph the timepiece in order to measure the peculiar delay time. Alternatively, the time code of the second exemplary embodiment may be photographed instead of the timepiece.

In the first exemplary embodiment, in order to specify the photographing delay time, the terminal device conducts communication with the server. Alternatively, the photographing delay time may be specified by photographing the time code of the second exemplary embodiment. That is, every time the clock time based on the reference clock is updated, the terminal device photographs display device 130 that is the subject in which the updated clock time is displayed. The terminal device specifies the difference between the clock time the subject photographing is started based on the clock of the terminal device and the clock time shown in the image acquired by the subject photographing as the photographing delay time. The photographing delay time can also be specified by the time code photographing.

In the second exemplary embodiment, server 120C includes time code detection decoder 126 and delay time deriver 127. Alternatively, terminal device 110C may include time code detection decoder 126 and delay time deriver 127. Server 120C may include display device 130.

In the first and second exemplary embodiments and the variation, the clock time at clock 111a or photographing system clock 111c that is the system clock is corrected, and the time stamp indicating the corrected clock time is added to the image (specifically, a picture or a frame). However, the terminal device may add the preceding-correction clock time at clock 111a or photographing system clock 111c that is the system clock to the image as the time stamp, and send the image to the server. In this case, the server corrects the time stamp added to the image based on the delay time between the clock of the terminal device and the clock of the server. In this case, a processing burden on the server increases with increasing number of images sent to the server. On the other hand, in the first and second exemplary embodiments and the variation, because the time stamp added to the image is already corrected, it is not necessary for the server to correct the time stamp, but the processing burden can largely be reduced.

In the first and second exemplary embodiments and the variation, the terminal device sends the image acquired by the photographing to the server in real time. Alternatively, the terminal device needs not to send the image to the server in real time. For example, the terminal device may temporarily store the image acquired by the photographing, and send the stored image to the server when the network has a free transmission band. The terminal device may reduce the data amount of the image acquired by the photographing, and send the image in which the data amount is reduced to the server in real time. For example, the terminal device reduces the data amount by reducing the image, or by lowering the frame rate of the moving image. In this case, the terminal device may send the full-size image or the full-frame rate image to the server when the network has a free transmission band.

Although the image processing methods according to one or the plurality of aspects are described above based on the first and second exemplary embodiments and the variation, the present disclosure is not limited to the first and second exemplary embodiment and the variation. The following cases are also included in one or the plurality of aspects.

(1) Specifically, each device is a computer system including a microprocessor, a ROM, a RAM, a hard disk unit, a display unit, a keyboard, a mouse, and the like. A computer program is stored in the RAM or the hard disk unit. The microprocessor is operated according to the computer program, whereby each device implements its function. At this point, in the computer program, a plurality of command codes indicating an instruction issued to the computer are combined in order to achieve a predetermined function.

(2) Some of or all the constituents constituting each device may be constructed with one system Large Scale Integration (LSI). The system LSI is a super-multifunctional LSI that is manufactured by integrating a plurality of components on one chip. Specifically, the system LSI is a computer system including a microprocessor, a ROM, a RAM, and the like. The computer program is stored in the RAM. The microprocessor is operated according to the computer program, whereby the system LSI implements its function.

(3) Some of or all the constituents constituting each device may be constructed with an IC card detachably attached to each device or a single module. The IC card or the module is a computer system including a microprocessor, a ROM, a RAM, and the like. The IC card or the module may include the super-multifunctional LSI. The microprocessor is operated according to the computer program, whereby the IC card or the module implements its function. The IC card or the module may have a tamper-resistance.

(4) The present disclosure may be the above methods. The present disclosure may be a computer program in which these methods are performed by the computer or a digital signal constructed with the computer program.

In the present disclosure, the computer program or the digital signal may be recorded in a computer-readable recording medium such as a flexible disk, a hard disk, a CD-ROM, an MO, a DVD, a DVD-ROM, a DVD-RAM, a Blu-ray Disc (BD), a semiconductor memory, and the like. The present disclosure may be the digital signal recorded in these recording media.

In the present disclosure, the computer program or the digital signal may be transmitted through an electric communication line, a wireless or wired communication line, a network typified by the Internet, data broadcasting, and the like.

The present disclosure may be a computer system including a microprocessor and a memory, the computer program is stored in the memory, and the microprocessor may be operated according to the computer program.

Alternatively, the program or the digital signal is transported while recorded in the recording medium, or the program or the digital signal is transported through the network and the like, which may allow the present disclosure to be implemented with another independent computer system.

(5) The first exemplary embodiment and the variations may be combined.

Third Exemplary Embodiment

Other application examples of the configurations of the image processing method and apparatus described in each exemplary embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 12:
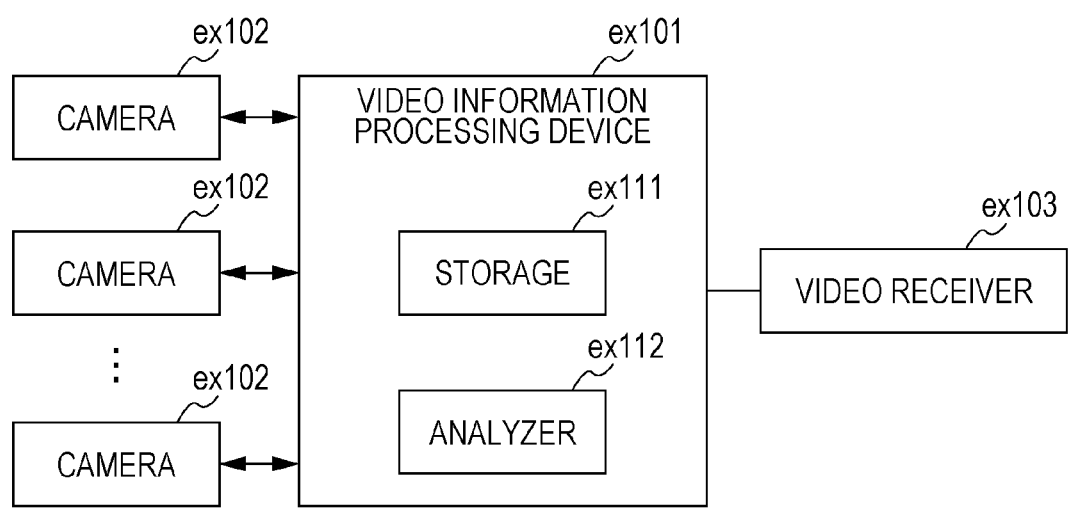
FIG. 12 is a diagram illustrating a configuration of a video information processing system.

FIG. 12 is a diagram illustrating a configuration of video information processing system ex100 according to the present exemplary embodiment. The present exemplary embodiment describes an example of preventing occurrence of a dead angle and an example of prohibiting capturing of a specific area.

Video information processing system ex100 illustrated in FIG. 12 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a dead angle from the video data stored in storage ex111, and transmits to the moving camera the instruction signal that indicates an instruction to the moving camera for preventing occurrence of a dead angle. The moving camera moves in response to the instruction signal, and continues capturing.

Analyzer ex112 detects a dead angle by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a dead angle an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a dead angle is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a dead angle by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a dead angle is highly likely to occur, based on the acquired positional relationship.

Here, the dead angle includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a dead angle even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a dead angle may be determined.

Note that detection of the area that is actually a dead angle is described above, but the area that needs to be detected in order to prevent occurrence of a dead angle is not limited to the area that is actually a dead angle. For example, when a plurality of objects to be captured exists and at least part of the objects is moving, a new dead angle is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new dead angle, based on the detected movement of the plurality of objects to be captured and positional information of camera ex102. In this case, video information processing apparatus ex101 may transmit the instruction signal to the moving camera to capture the area that is likely to become a dead angle, and video information processing apparatus ex101 may prevent occurrence of a dead angle.

Note that when there is a plurality of moving cameras, video information processing apparatus ex101 needs to select any of the moving cameras to which the instruction signal is to be transmitted in order to cause the moving camera to capture a dead angle or an area that is likely to become a dead angle. Moreover, when there is a plurality of moving cameras and there is a plurality of dead angles or areas that are likely to become dead angles, video information processing apparatus ex101 needs to determine which dead angle or area that is likely to become a dead angle each of the plurality of moving cameras is to capture. For example, video information processing apparatus ex101 selects the moving camera closest to a dead angle or an area that is likely to become a dead angle, based on a position of a dead angle or an area that is likely to become a dead angle, and a position of an area each moving camera is capturing. Moreover, video information processing apparatus ex101 may determine for each camera whether a new dead angle occurs when video data which the moving camera is currently capturing is not obtained, and video information processing apparatus ex101 may select the moving camera that is determined that a dead angle does not occur even when the video data which is currently being captured is not obtained.

The above-described configuration enables video information processing apparatus ex101 to prevent occurrence of a dead angle by detecting a dead angle and transmitting the instruction signal to the moving camera so as to prevent the dead angle.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras ex102.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described exemplary embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during halftime, video information processing apparatus ex101 may distribute a scene which the user has missed and which is considered to be important, based on the analysis result made by analyzer ex112. Moreover, video information processing apparatus ex101 may distribute the past video only when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 5. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, t a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras).

In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video of the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, he user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a dead angle, only some area of the capturing areas in the captured video data is likely to be needed for filling the dead angle. In this case, camera ex102 may generate extracted video data by extracting at least only the area needed for preventing occurrence of the dead angle from the video data, and transmit the generated extracted video data to video information processing apparatus ex101. This configuration can realize suppression of occurrence of the dead angle at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit only the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present exemplary embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present exemplary embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the outline video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore only the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may preferentially restore only the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using only high-quality data, or by preferentially using high-quality data among the plurality of pieces of video data stored in storage ex111.

Variation 14

Analyzer ex112 may restore the three-dimensional shape by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 13:
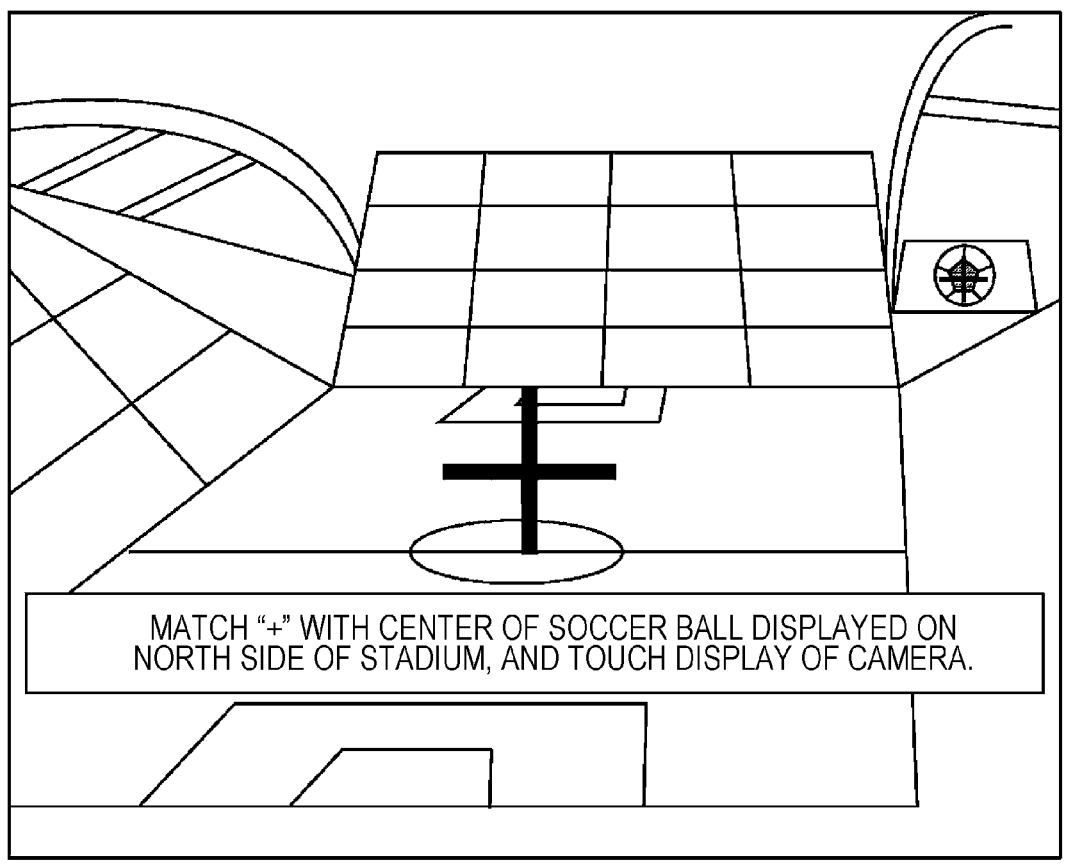
FIG. 13 is a diagram illustrating an example of a notification screen displayed when a camera is activated.

Moreover, the positional and angle information of camera ex102 is acquired by pointing camera ex102 at a specific point in the facility or in the stadium when camera ex102 is activated or at any timing. FIG. 13 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video only with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera weather and a road surface state in a direction of a destination, traffic congestion level and the like can be understood with better accuracy by using three-dimensional data modeled from a plurality of images.

Fourth Exemplary Embodiment

The processing described in each of the above-described exemplary embodiments can be carried out easily in a standalone computer system by recording a program for implementing the configuration of the image processing method described in each exemplary embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the exemplary embodiments and the systems using the application examples will be further described. The systems include an apparatus that uses the image processing method. A change in other configurations of the systems can be made appropriately in accordance with the circumstances.

Figure 14:
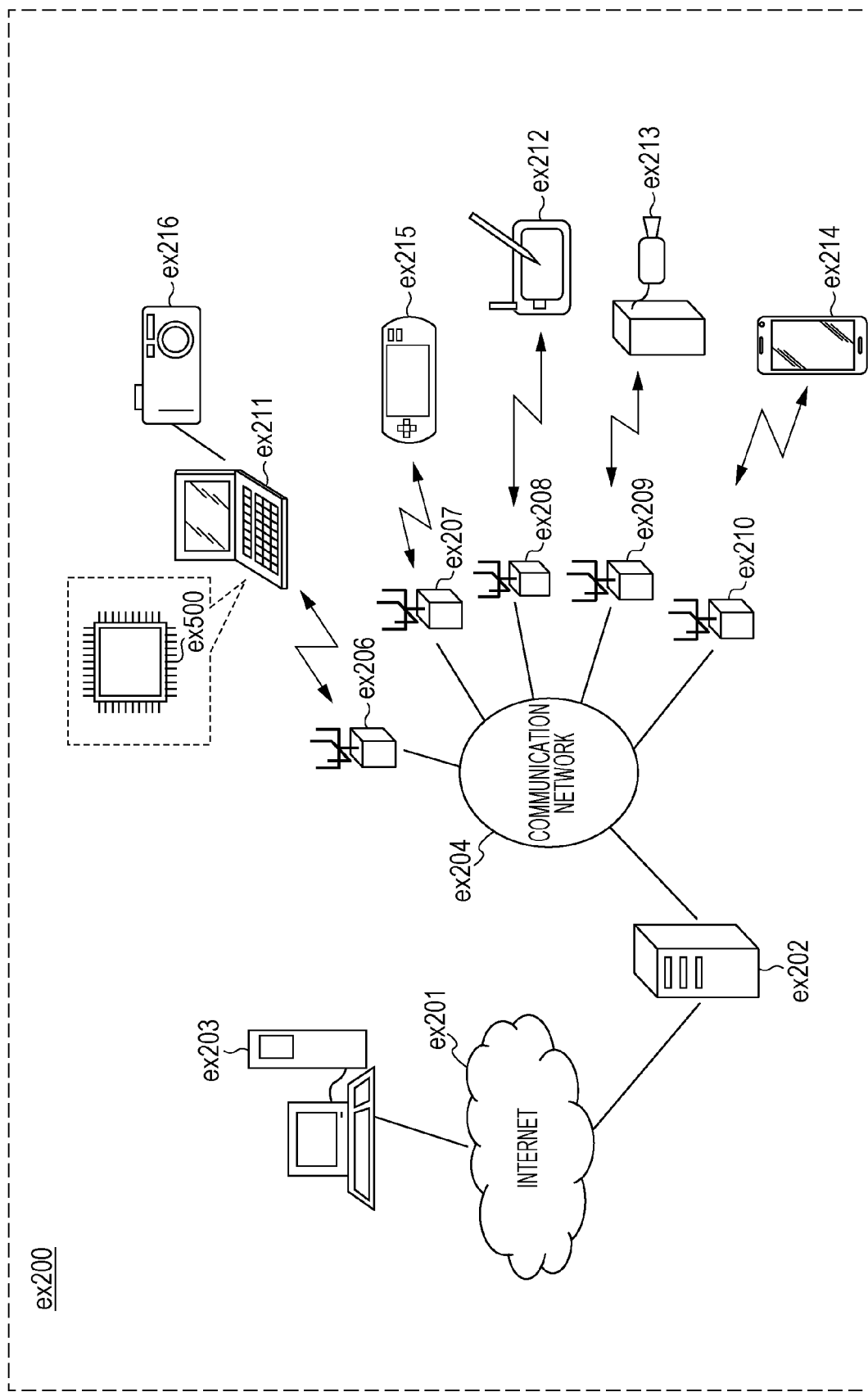
FIG. 14 is an overall configuration diagram of a content providing system that implements content distribution services.

FIG. 14 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 14, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communications (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may be formed as a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 15:
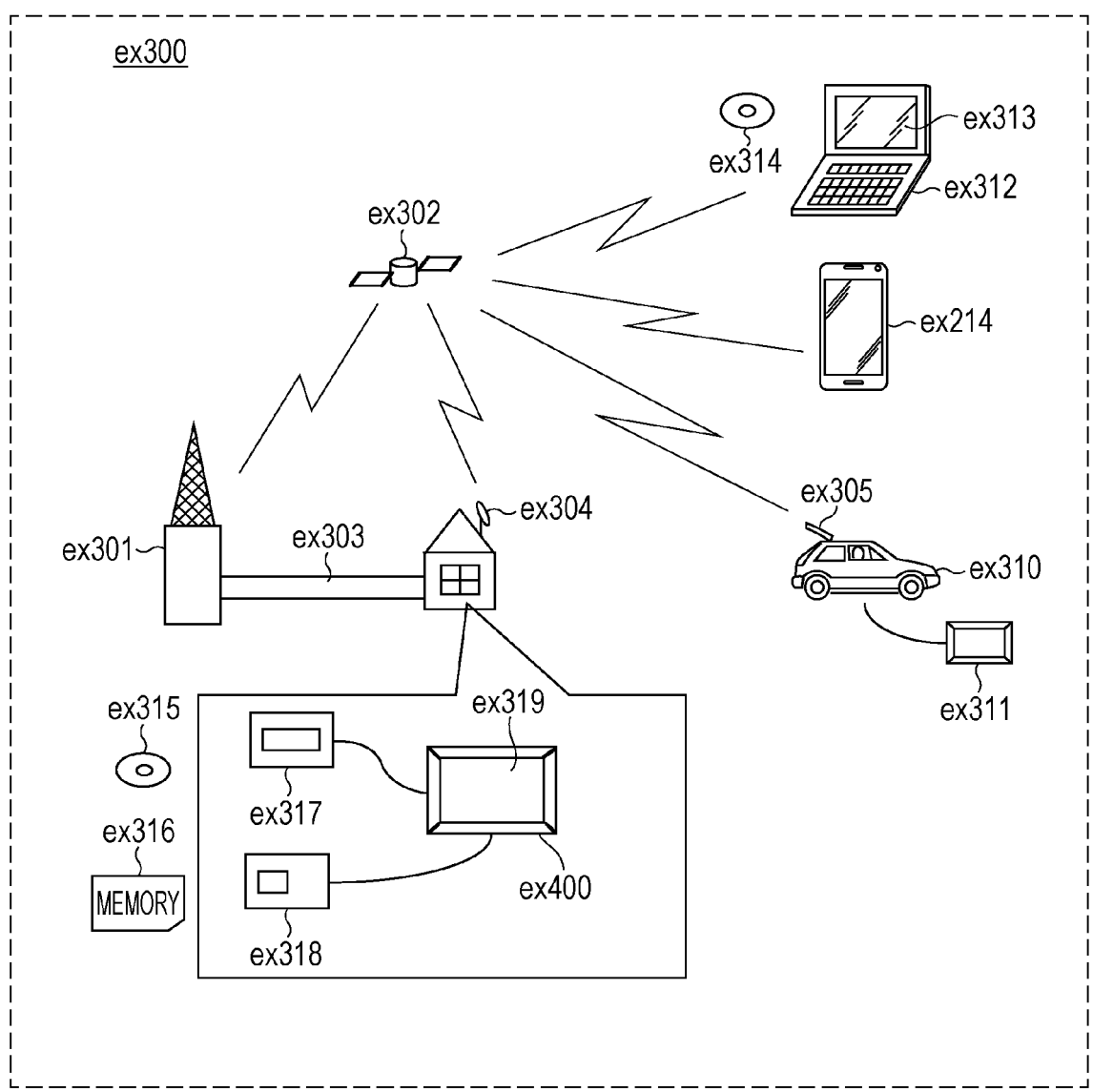
FIG. 15 is an overall configuration diagram of a digital broadcasting system.

Note that in addition to the example of content providing system ex200, each of the above-described exemplary embodiments may also be applied to digital broadcasting system ex300, as illustrated in FIG. 15. Specifically, broadcasting station ex301 transmits a radio wave of multiplexed data obtained by multiplexing video data with music data or the like via communication to broadcasting satellite ex302. This video data is data coded by the moving image coding method described in each of the above-described exemplary embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described exemplary embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 16:
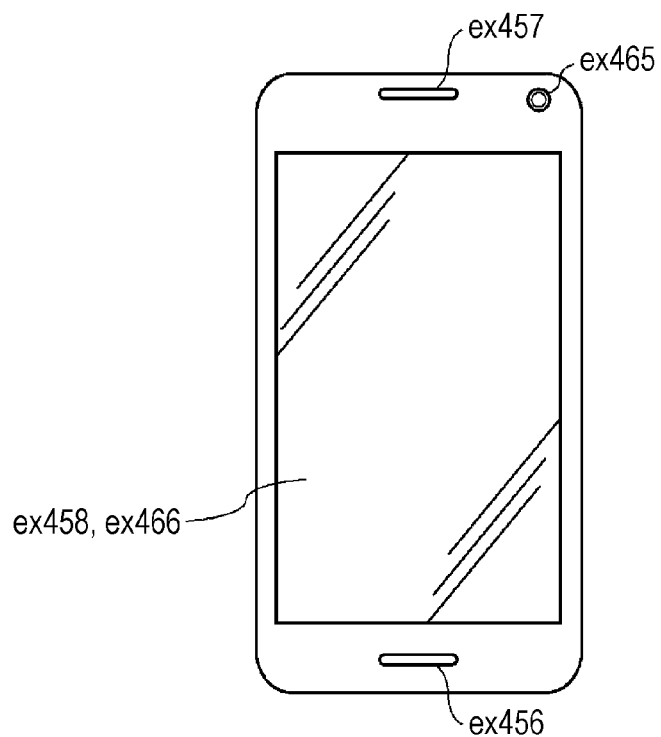
FIG. 16 is a diagram illustrating an example of a smartphone.
Figure 17:
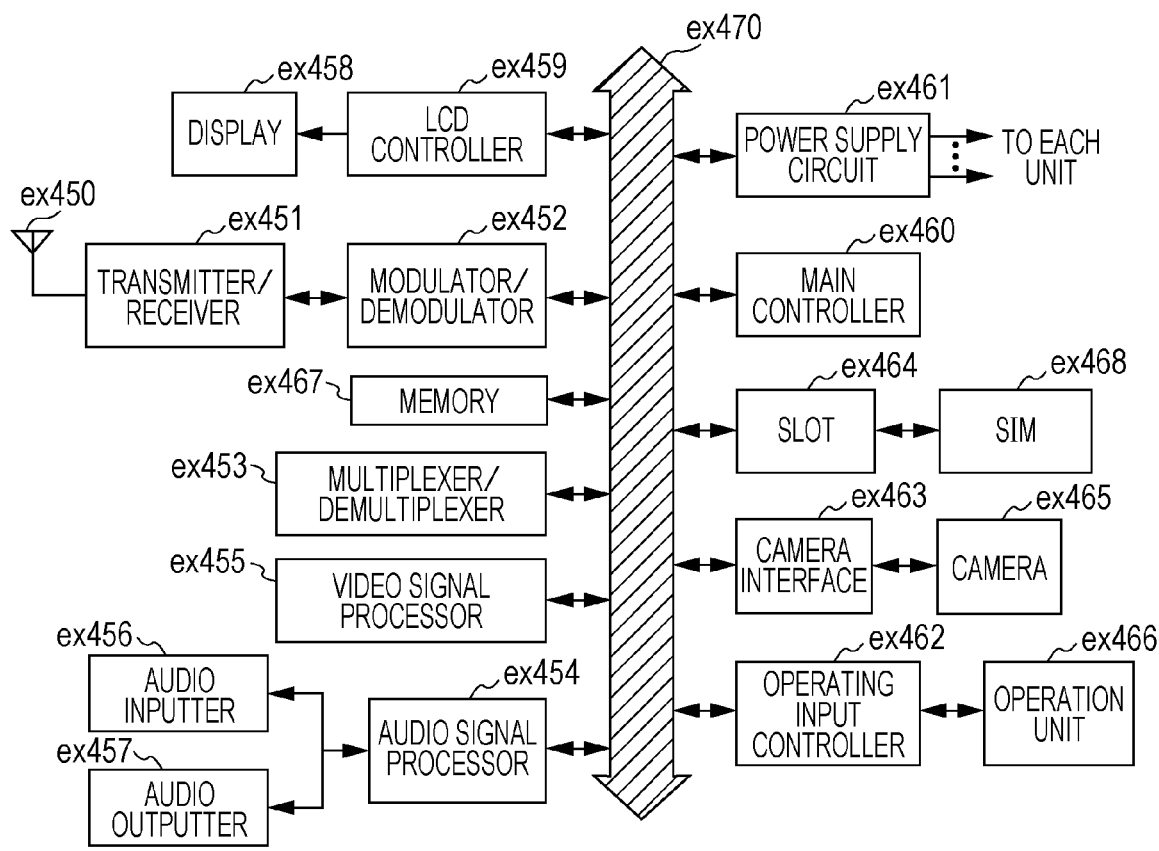
FIG. 17 is a block diagram illustrating a configuration example of a smartphone.

FIG. 16 is a diagram illustrating smartphone ex214. Moreover, FIG. 17 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 15, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above exemplary embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above exemplary embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present disclosure is not limited to the above-described exemplary embodiments, and various variations or modifications can be made without departing from the scope of the present disclosure.

The photographing method according to one aspect of the present disclosure can be applied to terminal devices, information display devices, or photographing devices, such as a television, a digital video recorder, a drive recorder, a mobile phone, a smartphone, a digital camera, a monitoring camera, and a digital video camera, which have the image photographing function.

The invention claimed is:

1. A photographing method for photographing by a first terminal device, the photographing method comprising:
   synchronizing a clock of the first terminal device with a reference clock;
   acquiring photographing clock time information indicating a photographing clock time which is based on the reference clock;
   specifying a photographing delay time from starting of photographing to performing of photographing; and
   photographing at the photographing clock time indicated by the photographing clock time information, based on the clock of the first terminal device already synchronized with the reference clock and the photographing delay time,
   wherein, in the specifying of the photographing delay time,
   the first terminal device photographs (i) a subject displaying a clock time based on the reference clock or (ii) image data including a signal for specifying the clock time, and
   a difference between (i) a clock time based on the clock of the first terminal device at which the photographing of the subject or the image data is started and (ii) a clock time acquired by the photographing of the subject or the image data, is specified as the photographing delay time.

2. The photographing method according to claim 1, further comprising:
   acquiring the photographing clock time information by a second terminal device; and
   photographing by the second terminal device at the photographing clock time indicated by the photographing clock time information based on the reference clock.

3. The photographing method according to claim 2, wherein
   the reference clock is a clock included in a server,
   the second terminal device synchronizes a clock of the second terminal device with the reference clock, and
   each of the first and second terminal devices acquires the photographing clock time information from the server.

4. The photographing method according to claim 2, wherein
   the reference clock is a clock of the second terminal device, and
   each of the first and second terminal devices acquires the photographing clock time information from a server.

5. The photographing method according to claim 1, wherein
   in the synchronizing of the clock time of the first terminal device,
   the first terminal device synchronizes a photographing clock managed based on a system clock of the first terminal device with the reference clock as the clock of the first terminal device.

6. The photographing method according to claim 1, further comprising:
   adding a time stamp to an image acquired by the photographing, the time stamp indicating a clock time at which the photographing is performed based on the clock of the first terminal device already synchronized with the reference clock; and
   sending the image to a server.

7. The photographing method according to claim 1, wherein in the photographing,
   the photographing is started at a clock time earlier than the photographing clock time indicated by the photographing clock time information by the photographing delay time.

8. The photographing method according to claim 1, wherein
   in the synchronizing of the clock of the first terminal device,
   the first terminal device receives a second packet indicating a clock time based on the reference clock from a server by sending a first packet to the server, and
   the clock of the first terminal device is synchronized with the reference clock by adjusting the clock of the first terminal device such that a difference between the clock time indicated by the second packet and a clock time at which the first packet is sent to the server based on the clock of the first terminal device becomes zero.

9. The photographing method according to claim 1, wherein
   in the synchronizing of the first terminal device,
   every time a clock time is updated based on the reference clock, the subject displaying the updated clock time is photographed, and
   the clock of the first terminal device is synchronized with the reference clock by adjusting the clock of the first terminal device such that a difference between a clock time based on the clock of the first terminal device and a clock time shown in an image acquired by the photographing becomes zero.

10. The photographing method according to claim 9, wherein
    the subject displays the updated clock time based on the reference clock as a one-dimensional code or a two-dimensional code.

11. The photographing method according to claim 10, further comprising:
    coding individually a numerical value of each place expressing a clock time based on the reference clock; and
    displaying the coded numerical value of each place in the subject.

12. The photographing method according to claim 11, wherein
    in the numerical value of each place,
    the numerical value of a first place is updated, coded, and displayed every time the clock time is updated based on the reference clock, and the numerical value of a second place is updated, coded, and displayed every time the clock time is updated N times, the N being an integer of 2 or more.

13. The photographing method according to claim 10, wherein
the one-dimensional code or the two-dimensional code is a rectangle in which a horizontal width is longer than a vertical width.

14. The photographing method according to claim 1, wherein
in the photographing by the first terminal device, the photographing starts to photograph a video from the photographing clock time indicated by the photographing clock time information, and
wherein the photographing method further comprises:
sending only a picture acquired in each second period longer than a first period from pictures acquired in each first period by the photographing of the video, to a server.

15. The photographing method according to claim 14, further comprising:
acquiring period information indicating the second period from the server by the first terminal device, and
wherein, in the sending, only a picture acquired in each second period indicated by the acquired period information is selected from the pictures acquired in each first period, and the selected picture is sent to the server.

16. A terminal device comprising:
a clock;
a processor; and
a memory having a computer program stored thereon, the computer program causing the processor to execute operations including:
synchronizing the clock with a reference clock;
acquiring photographing clock time information indicating a photographing clock time based on the reference clock;
specifying a photographing delay time from starting of photographing to performing of photographing; and
photographing at the photographing clock time indicated by the photographing clock time information, based on the clock already synchronized with the reference clock and the photographing delay time,
wherein, in the specifying of the photographing delay time,
in a case that (i) a subject displaying a clock time based on the reference clock or (ii) image data including a signal for specifying the clock time is photographed,
a difference between (i) a clock time based on the clock at which the photographing of the subject of the image data is started and (ii) a clock time acquired by the photographing of the subject or the image data, is specified as the photographing delay time.

17. A non-transitory recording medium having a computer program for a device including a clock, a processor, a camera and a communication circuit, the computer program causing the processor to execute operations comprising:
synchronizing the clock with a reference clock;
acquiring photographing clock time information indicating a photographing clock time which is based on the reference clock;
specifying a photographing delay time from starting of photographing to performing of photographing; and
photographing at the photographing clock time indicated by the photographing clock time information, based on the clock already synchronized with the reference clock and the photographing delay time,
wherein, in the specifying of the photographing delay time,
in a case that (i) a subject displaying a clock time based on the reference clock or (ii) image data including a signal for specifying the clock time is photographed,
a difference between (i) a clock time based on the clock at which the photographing of the subject or the image data is started and (ii) a clock time acquired by the photographing of the subject or the image data, is specified as the photographing delay time.

18. The photographing method according to claim 1, wherein
in the specifying of the photographing delay time,
in a case that the subject displays an updated clock time, every time a clock time is updated based on the reference clock,
a difference between a clock time based on the clock of the first terminal device at which the photographing of the subject is started and a clock time displayed by an image acquired by the photographing of the subject, is specified as the photographing delay time.

19. A photographing system comprising:
a server; and
a plurality of terminal devices each of which is according to claim 18,
wherein the server includes:
a reference clock;
a processor; and
a memory having a computer program stored thereon, the computer program causing the processor to execute operations including:
synchronizing a clock of each of the plurality of terminal devices with the reference clock of the server; and
sending photographing clock time information indicating a photographing clock time based on the reference clock of the server to each of the plurality of terminal devices.

20. A terminal device comprising:
a clock configured to generate a clock time;
a camera; and
a processor configured to:
output, at an instruction time based on the clock, a trigger signal to the camera to start photographing a subject to generate an image while the subject displays a clock time or a figure indicating the clock time, the clock time being updated based on a reference clock;
acquire a photographed clock time equal to the clock time displayed or indicated in the image;
calculate a delay time between the photographed clock time and the instruction time;
acquire a target clock time that is based on the reference clock; and
control the camera to start photographing at the target clock time that is based on the clock and the delay time.

21. The terminal device according to claim 20, wherein
the processor is configured to synchronize the clock with the reference clock based on the delay time.

22. The terminal device according to claim 20, further comprising:
a system clock, wherein
the clock is provided for photographing.

23. The terminal device according to claim 20, further comprising:
a network interface via which the target clock time is received.

24. The terminal device according to claim 20, wherein the trigger signal is generated by software stored on a memory of the terminal device.

\* \* \* \* \*